(12) United States Patent
Choi et al.

(10) Patent No.: US 12,068,810 B2
(45) Date of Patent: Aug. 20, 2024

(54) ELECTRONIC DEVICE HAVING TRANSPARENT ANTENNA

(71) Applicants: LG ELECTRONICS INC., Seoul (KR); KOREA ADVANCED INSTITUTE OF SCIENCE AND TECHNOLOGY, Daejeon (KR)

(72) Inventors: Kukheon Choi, Seoul (KR); Ilnam Cho, Seoul (KR); Seungmin Woo, Seoul (KR); Byeongyong Park, Seoul (KR); Jeongwook Kim, Daejeon (KR); Jongwon Yu, Daejeon (KR); Kwangseok Kim, Daejeon (KR)

(73) Assignees: LG ELECTRONICS INC., Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 180 days.

(21) Appl. No.: 17/758,815

(22) PCT Filed: Mar. 6, 2020

(86) PCT No.: PCT/KR2020/003154
§ 371 (c)(1),
(2) Date: Jul. 14, 2022

(87) PCT Pub. No.: WO2021/177490
PCT Pub. Date: Sep. 10, 2021

(65) Prior Publication Data
US 2023/0041218 A1    Feb. 9, 2023

(51) Int. Cl.
*H04B 7/0413*    (2017.01)
*H01Q 1/24*    (2006.01)
(Continued)

(52) U.S. Cl.
CPC ........... *H04B 7/0413* (2013.01); *H01Q 1/243* (2013.01); *H01Q 1/3291* (2013.01); *H01Q 1/48* (2013.01);
(Continued)

(58) Field of Classification Search
CPC ................................. H01Q 9/045; H01Q 9/40
See application file for complete search history.

(56) References Cited

U.S. PATENT DOCUMENTS 8,427,373 B2 *   4/2013   Jiang ................... H01Q 9/0407
                                                        343/846
10,749,272 B2 *  8/2020   Wu ......................... H01Q 21/24
(Continued)

FOREIGN PATENT DOCUMENTS

JP    2004-112652    4/2004
KR    2009-0046590   5/2009
(Continued)

OTHER PUBLICATIONS

PCT International Application No. PCT/KR2020/003154, International Search Report dated Nov. 27, 2020, 5 pages.

*Primary Examiner* — AB Salam Alkassim, Jr.
(74) *Attorney, Agent, or Firm* — LEE, HONG, DEGERMAN, KANG & WAIMEY

(57) ABSTRACT

Provided according to the present invention is an electronic device having an antenna. The electronic device may comprise: a transparent antenna built into a display and configured to emit a signal to the front of the display; and a transmission line for feeding the transparent antenna. The transparent antenna is configured as a rectangular patch rotated at a predetermined angle, and a portion of the left and right-side areas of the rectangular patch may be formed as vertical lines.

13 Claims, 19 Drawing Sheets

(51) Int. Cl.
*H01Q 1/32* (2006.01)
*H01Q 1/48* (2006.01)
*H01Q 9/04* (2006.01)
*H01Q 9/40* (2006.01)
*H01Q 21/28* (2006.01)

(52) U.S. Cl.
CPC .............. *H01Q 9/045* (2013.01); *H01Q 9/40* (2013.01); *H01Q 21/28* (2013.01)

(56) References Cited

U.S. PATENT DOCUMENTS

| | | | |
|---|---|---|---|
| 11,165,169 B2 * | 11/2021 | Kim | H01Q 21/08 |
| 2004/0100406 A1 * | 5/2004 | Okado | H01Q 1/38 |
| | | | 343/846 |
| 2005/0146471 A1 * | 7/2005 | Kwon | H01Q 1/38 |
| | | | 343/702 |
| 2014/0106684 A1 | 4/2014 | Burns et al. | |
| 2014/0340279 A1 * | 11/2014 | Bayram | H01Q 1/24 |
| | | | 703/1 |
| 2015/0236420 A1 * | 8/2015 | Lino | H01Q 1/3291 |
| | | | 343/894 |
| 2019/0058264 A1 * | 2/2019 | Jung | H01Q 9/0435 |
| 2020/0373673 A1 * | 11/2020 | Hashemi | H01Q 21/0025 |
| 2020/0379607 A1 * | 12/2020 | Oh | H01Q 21/065 |
| 2022/0140482 A1 * | 5/2022 | Lee | H05K 1/0243 |
| | | | 343/905 |
| 2022/0140495 A1 * | 5/2022 | Kim | H01Q 9/0407 |
| | | | 343/700 MS |
| 2022/0247083 A1 * | 8/2022 | Kim | H01Q 21/0075 |
| 2022/0269319 A1 * | 8/2022 | Lee | H01Q 1/38 |
| 2022/0271412 A1 * | 8/2022 | Choi | H01Q 21/24 |
| 2022/0276682 A1 * | 9/2022 | Yu | G02F 1/13338 |
| 2022/0311133 A1 * | 9/2022 | Oh | H01Q 1/36 |
| 2022/0384933 A1 * | 12/2022 | Choi | H01Q 21/06 |
| 2022/0416402 A1 * | 12/2022 | Choi | H01Q 1/44 |
| 2023/0098313 A1 * | 3/2023 | Lee | H01Q 1/243 |
| | | | 343/846 |
| 2023/0108271 A1 * | 4/2023 | Park | H01Q 5/10 |
| | | | 343/725 |
| 2023/0163456 A1 * | 5/2023 | Choi | G06F 3/0446 |
| | | | 343/841 |
| 2023/0216178 A1 * | 7/2023 | Choi | H01Q 1/364 |
| | | | 343/702 |
| 2023/0217584 A1 * | 7/2023 | Choi | H01Q 5/357 |
| | | | 174/255 |

FOREIGN PATENT DOCUMENTS

| | | |
|---|---|---|
| KR | 2019-0071411 | 6/2019 |
| KR | 10-1962821 | 7/2019 |

* cited by examiner (a) Type 0

(a) Type 1

(a)

(b)

(a)

Structure of FIG4(a)    Structure of FIG4(b)

ELECTRONIC DEVICE HAVING TRANSPARENT ANTENNA

CROSS-REFERENCE TO RELATED APPLICATIONS

This application is the National Stage filing under 35 U.S.C. 371 of International Application No. PCT/KR2020/003154, filed on Mar. 6, 2020, the contents of which is hereby incorporated by reference herein in its entirety.

TECHNICAL FIELD

The present disclosure relates to a transparent antenna. A specific implementation relates to an electronic device or vehicle having a transparent antenna.

BACKGROUND ART

Electronic devices may be divided into mobile/portable terminals and stationary terminals according to mobility. Meanwhile, the electronic devices provide various services in recent years by virtue of commercialization of wireless communication systems using an LTE communication technology. Also, it is expected that in the future, wireless communication systems using 5G communication technology will be commercialized to provide a variety of services. Meanwhile, some of LTE frequency bands may be allocated to provide 5G communication services.

In this regard, the electronic device may be configured to provide 5G communication services in various frequency bands. Recently, attempts have been made to provide 5G communication services using a Sub-6 band below a 6 GHz band. In the future, it is also expected to provide 5G communication services by using a millimeter wave (mm-Wave) band in addition to the Sub-6 band for faster data rate.

In recent years, the necessity of providing such a communication service through a vehicle is increasing. Meanwhile, in relation to a communication service, the necessity for a 5G communication service, which is a next-generation communication service, as well as an existing communication service such as Long Term Evolution (LTE) is emerging.

Meanwhile, a plurality of other antennas may be disposed in an electronic device or a vehicle. Accordingly, there is a need to transmit and receive signals through a front portion of the electronic device while preventing interference with a plurality of existing antennas. To this end, research on a transparent antenna embedded into or implemented on a display of an electronic device is being conducted.

Meanwhile, such a transparent antenna may be implemented in a specific structure such as a rectangular patch. In this case, there is a problem in that a current does not contribute to antenna radiation in an edge region depending on the structure of the transparent antenna. In this regard, in general, when a transparent electrode is used, there is a problem in that it is difficult to have high radiation efficiency in a wide band due to a large electrical loss.

DISCLOSURE OF INVENTION

Technical Problem

An aspect of the present disclosure is to solve the above-mentioned problems and other problems. Furthermore, another aspect of the present disclosure is to improve the radiation efficiency of a transparent antenna provided in an electronic device or a vehicle.

Still another aspect of the present disclosure is to provide a transparent antenna structure having a wide radiation efficiency band for vehicle and mobile communication using a 5G Sub6 band.

Yet still another aspect of the present disclosure is to provide an antenna structure for providing an optimal radiation efficiency for each different band.

Still yet another aspect of the present disclosure is to provide multi-input multi-output (MIMO) optimized for each band in a configuration of a plurality of antennas for providing an optimal radiation efficiency for each different band.

Yet still another aspect of the present disclosure is to provide carrier aggregation optimized for a combination of a plurality of bands in a configuration of a plurality of antennas for providing an optimal radiation efficiency for each different band.

Solution to Problem

In order to achieve the foregoing or other objectives, an electronic device having an antenna according to the present disclosure is provided. The electronic device may include a transparent antenna embedded into a display and configured to radiate a signal to a front of the display; and a transmission line that feeds the transparent antenna. The transparent antenna may be configured in the form of a rectangular patch rotated at a predetermined angle, and portions of a left region and a right region of the rectangular patch may be defined as vertical lines.

According to an embodiment, the transparent antenna may include a rectangular patch antenna disposed on the display, and disposed in the form of being rotated at the predetermined angle; a feeding line configured to transmit a signal to the rectangular patch antenna; and a ground region disposed in a left region and a right region of the feeding line.

According to an embodiment, the vertical line defined in the rectangular patch may be defined in a direction perpendicular to a current direction of the ground region.

According to an embodiment, the transparent antenna may be configured with a plurality of antennas in different regions of the display, and in a first antenna of the plurality of antennas, portions of a left region and a right region thereof may be defined as vertical lines.

According to an embodiment, in a second antenna of the plurality of antennas, partial lines of a left region and a right region thereof may be defined as curves in a concave form.

According to an embodiment, in a third antenna of the plurality of antennas, partial lines of a left region and a right region thereof may be defined as curves in a convex form.

According to an embodiment, the electronic device may further include a transceiver circuit operatively coupled to the first antenna to the third antenna, and configured to transmit and receive a signal through at least one of the first antenna to the third antenna.

According to an embodiment, the electronic device may further include a baseband processor operatively coupled to the transceiver circuit, and configured to control the transceiver circuit.

According to an embodiment, the baseband processor may control the transceiver circuit to transmit or receive a first signal through the first antenna having the vertical lines in a first band within a 5G Sub6 band.

According to an embodiment, the baseband processor may control the transceiver circuit to transmit or receive a second signal through the second antenna in which the partial lines thereof are defined in a concave form in a second band lower than the first band.

According to an embodiment, the baseband processor may control the transceiver circuit to transmit or receive a third signal through the third antenna in which the partial lines thereof are defined in a convex form in a third band higher than the first band.

According to an embodiment, the transparent antenna may be configured with first to fourth antennas in different regions of the display. In the first antenna and the fourth antenna, portions of a left region and a right region thereof may be defined as vertical lines. In the second antenna, partial lines of a left region and a right region thereof may be defined as curves in a concave form. In the third antenna, partial lines of a left region and a right region thereof may be defined as curves in a convex form.

According to an embodiment, the transceiver circuit may be operatively coupled to the first antenna to the fourth antenna, and configured to transmit and receive a signal through at least one of the first antenna to the fourth antenna.

According to an embodiment, the baseband processor may control the transceiver circuit to perform multi-input multi-output (MIMO) by transmitting or receiving a first signal through the first antenna having the vertical lines in a first band that is a 5G Sub6 band, and by transmitting or receiving a second signal through the second antenna.

According to an embodiment, the baseband processor may perform multi-input multi-output (MIMO) through one of the first antenna and the fourth antenna and the second antenna in a second band lower than the first band. The baseband processor may control the transceiver circuit to transmit or receive a second signal through the second antenna in the second band.

According to an embodiment, the baseband processor may perform multi-input multi-output (MIMO) through one of the first antenna and the fourth antenna and the third antenna in a third band higher than the first band. The baseband processor may control the transceiver circuit to transmit or receive a third signal through the third antenna in the third band.

According to an embodiment, the baseband processor may perform carrier aggregation (CA) by transmitting or receiving a signal through one of the first antenna and the fourth antenna in the first band, and through the second antenna in the form of a concave line in a second band lower than the first band The baseband processor may perform carrier aggregation (CA) by transmitting or receiving a signal through one of the first antenna and the fourth antenna in the first band, and through the third antenna in the form of a convex line in a third band higher than the first band.

There is provided a vehicle having a display according to another aspect of the present disclosure. The vehicle may include a transparent antenna embedded into a vehicle display and configured to radiate a signal to a front of the display, and an antenna including a transmission line that feeds the transparent antenna.

According to an embodiment, the vehicle may include a transceiver circuit operatively coupled to the transparent antenna through the transmission line, and configured to transmit and receive a signal to and from the transparent antenna; and a baseband processor operatively coupled to the transceiver circuit, and configured to control the transceiver circuit.

According to an embodiment, the transparent antenna may be configured in the form of a rectangular patch rotated at a predetermined angle, and portions of a left region and a right region of the rectangular patch may be defined as vertical lines.

According to an embodiment, the transparent antenna may include a rectangular patch antenna disposed on the display, and disposed in the form of being rotated at the predetermined angle; a feeding line configured to transmit a signal to the rectangular patch antenna; and a ground region disposed in a left region and a right region of the feeding line.

According to an embodiment, the vertical line defined in the rectangular patch may be defined in a direction perpendicular to a current direction of the ground region.

According to an embodiment, the transparent antenna may be configured with a plurality of antennas in different regions of the display. In a first antenna and a fourth antenna of the plurality of antennas, portions of a left region and a right region thereof may be defined as vertical lines. In a second antenna and a fifth antenna of the plurality of antennas, partial lines of a left region and a right region thereof may be defined as curves in a concave form. In a third antenna and a sixth antenna of the plurality of antennas, partial lines of a left region and a right region thereof may be defined as curves in a convex form. The first antenna to the third antenna may be sequentially adjacent to one another to be disposed at one side of the display, and the fourth antenna to the sixth antenna may be sequentially adjacent to one another to be disposed at the other side of the display.

According to an embodiment, the baseband processor may control the transceiver circuit to perform MIMO by transmitting and receiving a first signal and a second signal through the first antenna and the fourth antenna each having the vertical lines in a first band within a 5G Sub6 band. The baseband processor may control the transceiver circuit to transmit or receive a third signal and a fourth signal through the second antenna and the fifth antenna in which the partial lines are defined in a concave form in a second band lower than the first band. The baseband processor may control the transceiver circuit to transmit or receive a fifth signal and a sixth signal through the third antenna and the sixth antenna in which the partial lines are defined in a convex form in a third band higher than the first band.

According to an embodiment, the baseband processor may perform carrier aggregation (CA) by transmitting or receiving a signal through one of the first antenna and the fourth antenna in the first band, and through one of the second antenna and the fifth antenna in the form of a concave line in a second band lower than the first band. The baseband processor may perform carrier aggregation (CA) by transmitting or receiving a signal through one of the first antenna and the fourth antenna in the first band, and through one of the third antenna and the sixth antenna in the form of a convex line in a third band higher than the first band.

Advantageous Effects of Invention

The technical effects of such a transparent antenna provided in an electronic device or a vehicle will be described as follows.

According to an embodiment, a vertical line may be defined in a region where an electric field is formed in a state in which a transparent antenna element provided in an electronic device or a vehicle is rotated at a predetermined angle to improve radiation efficiency.

According to an embodiment, a structure capable of concentrating a surface current on an edge surface of an antenna element may be proposed, thereby enhancing electric field radiation to maximize radiation efficiency.

According to an embodiment, a resonance phenomenon between a ground region and a radiator may be generated in a wide band to improve a radiation efficiency bandwidth.

According to an embodiment, since maximum and minimum values are higher than those of the efficiency of a transparent antenna in the related art and a radiation efficiency band thereof is wide, it is suitable for use in 5G vehicle and mobile communication.

According to an embodiment, a transparent antenna structure having a wide radiation efficiency band for vehicle and mobile communication using a 5G Sub6 band may be provided for each band.

According to an embodiment, an antenna structure may be provided in the form of a vertical line, a concave line, or a convex line for each different band, thereby providing an optimal radiation efficiency for each different band.

According to an embodiment, in a configuration of a plurality of antennas for providing an optimal radiation efficiency for each different band, a radiation efficiency and a characteristic difference between antennas having different shapes may be taken into consideration, thereby providing multi-input multi-output (MIMO) optimized for each band.

According to an embodiment, in a configuration of a plurality of antennas for providing optimal radiation efficiency for each different band, a radiation efficiency and a characteristic difference between antennas having different shapes may be taken into consideration, thereby providing carrier aggregation optimized for a combination of a plurality of bands.

Further scope of applicability of the present disclosure will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art.

MODE FOR THE INVENTION

Figure 1:
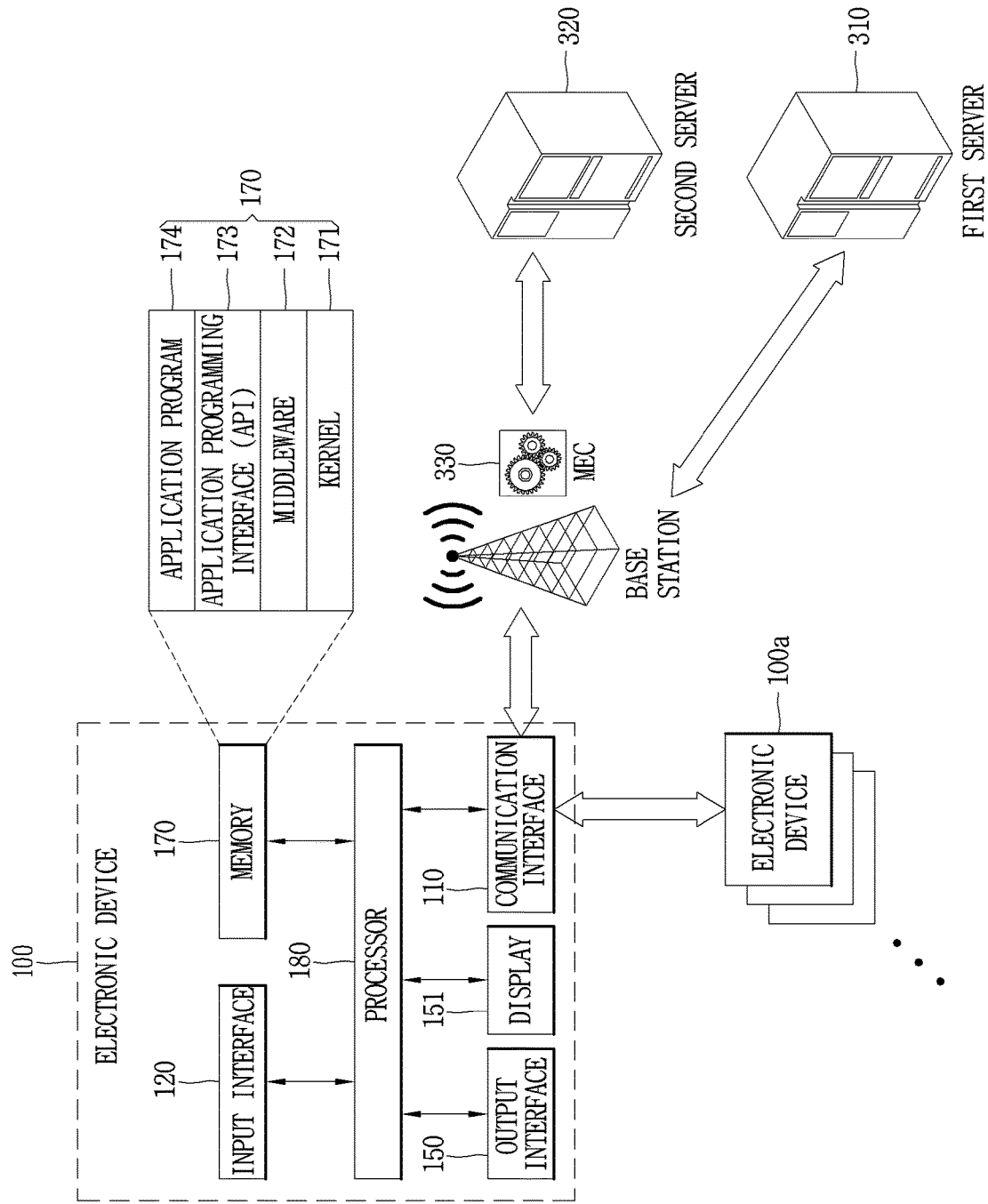
FIG. 1 shows a configuration for explaining an electronic device according to an embodiment and an interface between the electronic device and an external device or a server.

Hereinafter, preferred embodiments of the present disclosure will be described in detail with reference to the accompanying drawings, and the same or similar elements are designated with the same numeral references regardless of the numerals in the drawings and redundant description thereof will be omitted. In general, a suffix such as "module" and "unit" may be used to refer to elements or components. Use of such a suffix herein is merely intended to facilitate description of the specification, and the suffix itself is not intended to give any special meaning or function. In describing the present disclosure, moreover, the detailed description will be omitted when a specific description for publicly known technologies to which the invention pertains is judged to obscure the gist of the present disclosure. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like.

However, it may be easily understood by those skilled in the art that the configuration according to the embodiments of this specification can also be applied to stationary terminals such as digital TV, desktop computers, digital signages, and the like, excluding a case of being applicable only to the mobile terminals.

Figure 2A:
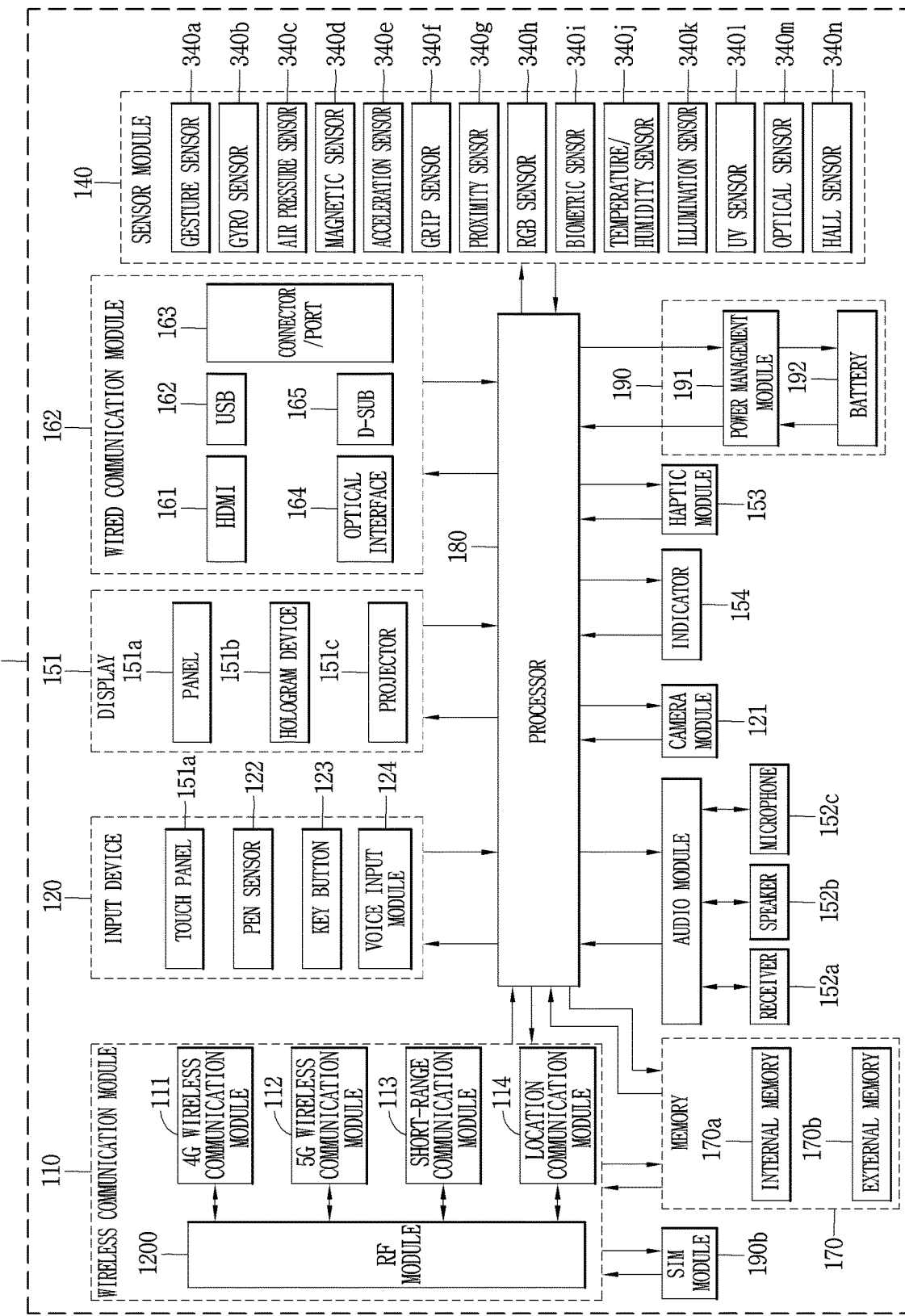
FIG. 2A shows a detailed configuration of the electronic device of FIG. 1. On the other hand.
Figure 2B:
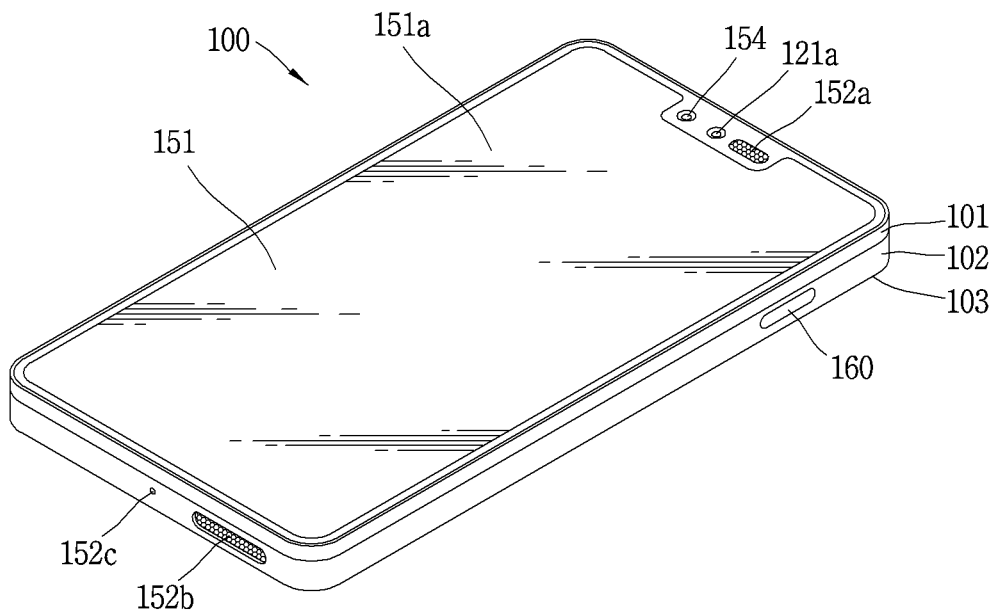
FIGS. 2B and 2C are conceptual views in which an example of an electronic device related to the present disclosure is seen from different directions.
Figure 2C:
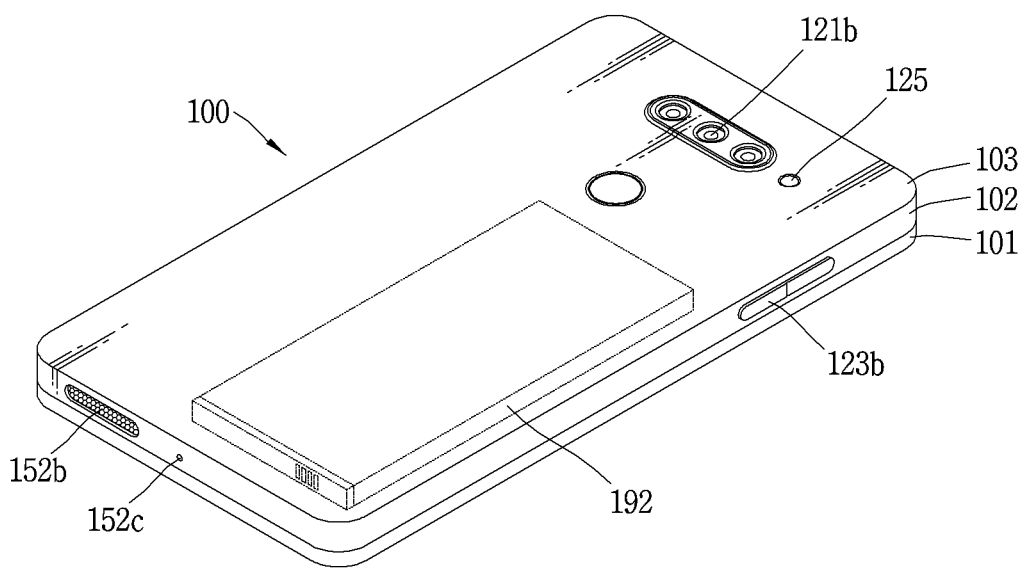

FIG. 1 shows a configuration for explaining an electronic device according to an embodiment and an interface between the electronic device and an external device or a server. On the other hand, referring to FIGS. 2A to 2C, FIG. 2A shows a detailed configuration of the electronic device of FIG. 1. On the other hand, FIGS. 2B and 2C are conceptual views in which an example of an electronic device related to the present disclosure is seen from different directions.

Referring to FIG. 1, an electronic device 100 may include a communication interface 110, an input interface (or an input device) 120, an output interface (or an output device) 150, and a processor 180. Here, the communication interface 110 may refer to a wireless communication module 110. Further, the electronic device 100 may further include a display 151 and a memory 170. FIG. 1 illustrates the electronic device having various components, but it may be understood that implementing all of the illustrated components is not a requirement. Greater or fewer components may alternatively be implemented.

In more detail, among others, the wireless communication module 110 may typically include one or more modules which permit communications such as wireless communications between the electronic device 100 and a wireless communication system, communications between the electronic device 100 and another electronic device, or communications between the electronic device 100 and an external server. Further, the wireless communication module 110 may typically include one or more modules which connect the electronic device 100 to one or more networks. Here, the one or more networks may be, for instance, a 4G communication network and a 5G communication network.

Referring to FIGS. 1 and 2A, the wireless communication module 110 may include at least one of a 4G wireless communication module 111, a 5G wireless communication module 112, a short-range communication module 113, a location information module 114 and the like. In this regard, the 4G wireless communication module 111, the 5G wireless communication module 112, the short-range communication module 113, and the location information module 114 may be implemented with a baseband processor such as a modem. For an example, the 4G wireless communication module 111, the 5G wireless communication module 112, the short-range communication module 113 and the location information module 114 may be implemented as a transceiver circuit and a baseband processor operating in an IF band. Meanwhile, an RF module 1200 may be implemented as an RF transceiver circuit operating in an RF frequency band of each communication system. However, the present disclosure is not limited thereto, and the 4G wireless communication module 111, the 5G wireless communication module 112, the short-range communication module 113 and the location information module 114 may be interpreted to include each RF module.

The 4G wireless communication module 111 may transmit and receive 4G signals to and from 4G base stations through a 4G mobile communication network. At this time, the 4G wireless communication module 111 may transmit one or more 4G transmission signals to the 4G base station. Furthermore, the 4G wireless communication module 111 may receive one or more 4G reception signals from the 4G base station. In this regard, up-link (UL) multi-input multi-output (MIMO) may be performed by a plurality of 4G transmission signals transmitted to the 4G base station. Furthermore, down-link (DL) multi-input multi-output (MIMO) may be performed by a plurality of 4G reception signals received from the 4G base station.

The 5G wireless communication module 112 may transmit and receive 5G signals to and from 5G base stations through a 5G mobile communication network. Here, the 4G base station and the 5G base station may have a non-standalone (NSA) structure. For instance, the 4G base station and the 5G base station may have a co-located structure disposed at the same location within a cell. Alternatively, the 5G base station may be deployed in a stand-alone (SA) structure at a separate location from the 4G base station.

The 5G wireless communication module 112 may transmit and receive 5G signals to and from 5G base stations through a 5G mobile communication network. At this time, the 5G wireless communication module 112 may transmit one or more 5G transmission signals to the 5G base station. Furthermore, the 5G wireless communication module 112 may receive one or more 5G reception signals from the 5G base station.

In this case, a 5G frequency band may use the same band as a 4G frequency band, and it may be referred to as LTE re-farming. Meanwhile, a Sub6 frequency band, which is a range of 6 GHz or less, may be used as the 5G frequency band.

On the contrary, a millimeter wave (mmWave) band may be used as a 5G frequency band to perform broadband high-speed communication. When the mmWave band is used, the electronic device 100 may perform beamforming for communication coverage expansion with a base station.

Meanwhile, regardless of the 5G frequency band, in a 5G communication system, a larger number of multi-input multi-output (MIMO) may be supported to improve transmission speed. In this regard, Up-Link (UL) MIMO may be performed by a plurality of 5G transmission signals transmitted to a 5G base station. In addition, DL MIMO may be performed by a plurality of 5G reception signals received from the 5G base station.

Meanwhile, the wireless communication module 110 may be in a dual connectivity (DC) state with a 4G base station and a 5G base station through the 4G wireless communication module 111 and the 5G wireless communication module 112. As such, the dual connectivity with the 4G base station and the 5G base station may be referred to as EUTRAN NR DC (EN-DC). Here, EUTRAN is an abbreviated form of "Evolved Universal Telecommunication Radio Access Network", and refers to a 4G wireless communication system. Also, NR is an abbreviated form of "New Radio" and refers to a 5G wireless communication system.

On the other hand, when the 4G base station and the 5G base station have a co-located structure, it is possible to improve throughput through inter-CA (Carrier Aggregation). Therefore, in an EN-DC state with the 4G base station and the 5G base station, 4G reception signals and 5G reception signals may be simultaneously received through the 4G wireless communication module 111 and the 5G wireless communication module 112.

The short-range communication module 113 is configured to facilitate short-range communications. Suitable technologies for implementing such short-range communications include Bluetooth, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 113 in general supports wireless communications between the electronic device 100 and a wireless communication system, communications between the electronic device 100 and another electronic device, or communications between the electronic device and a network where another electronic device (or an external server) is located, via wireless area networks. The short-range communication module denotes a module for short-range communications.

Meanwhile, short-range communication between electronic devices may be performed using the 4G wireless communication module 111 and the 5G wireless communication module 112. In one implementation, short-range communication may be performed between electronic devices in a device-to-device (D2D) manner without passing through base stations.

Meanwhile, for transmission speed improvement and communication system convergence, carrier aggregation (CA) using at least one of the 4G wireless communication module 111 and 5G wireless communication module 112 and the Wi-Fi communication module 113. In this regard, 4G+WiFi carrier aggregation (CA) may be performed using the 4G wireless communication module 111 and the Wi-Fi communication module 113. Alternatively, 5G+WiFi carrier aggregation (CA) may be performed using the 5G wireless communication module 112 and the Wi-Fi communication module 113.

The location information module 114 is a module for acquiring a location (or current location) of an electronic device, and a representative example thereof includes a Global Positioning System (GPS) module or a Wireless Fidelity (WiFi) module. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless access point (AP) which transmits or receives a wireless signal to or from the Wi-Fi module. As the need arises, the location information module 114 may perform any function of the other modules of the wireless communication unit 110 to obtain data on the location of the electronic device. The location information module 114 is a module used for acquiring the position (or the current position) of the electronic device and may not be limited to a module for directly calculating or acquiring the position of the electronic device.

Specifically, when the electronic device utilizes the 5G wireless communication module 112, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input device 120 may include a pen sensor 1200, a key button 123, a voice input module 124, a touch panel 151a, and the like. On the other hand, the input device 120 may include a camera module 121 for inputting an image signal, a microphone 152c or an audio input module for inputting an audio signal, or a user input unit 123 (e.g., a touch key, a push key (or a mechanical key), etc.) for allowing a user to input information. Audio data or image data collected by the input device 120 may be analyzed and processed by a user's control command.

The camera module 121 is a device capable of capturing still images and moving images. According to one embodiment, the camera module 121 may include one or more image sensors (e.g., a front sensor or a rear sensor), a lens, an image signal processor (ISP), or a flash (e.g., LED or lamp).

The sensor module 140 may typically be implemented using one or more sensors configured to sense internal information of the electronic device, the surrounding environment of the electronic device, user information, and the like. For example, the sensor module 140 may include at least one of a gesture sensor 340a, a gyro sensor 340b, a barometric pressure sensor 340c, a magnetic sensor 340d, an acceleration sensor 340e, a grip sensor 340f, a proximity sensor 340g, a color sensor 340h (e.g., RGB (red, green, blue) sensor), a biometric sensor 340i, a temperature/humidity sensor 340j, an illuminance sensor 340k, or a UV (ultra violet) sensor 340l, an optical sensor 340m, and a hall sensor 340n. In addition, the sensor module 140 may include at least one of a finger scan sensor, an ultrasonic sensor, an optical sensor (e.g., a camera (refer to 121)), a microphone (refer to 152c), a battery gauge, an environmental sensor (e.g., a barometer, a hygrometer, a thermometer, a radiation detection sensor, a thermal detection sensor, a gas detection sensor, etc.), and a chemical sensor (e.g., an electronic nose, a healthcare sensor, a biometric sensor, etc.). The electronic device disclosed herein may be configured to utilize information obtained from one or more sensors, and combinations thereof.

The output interface 150 is configured to generate an output related to visual, auditory or tactile sense, and may include at least one of a display 151, an audio module 152, a haptic module 153, and an indicator 154.

In this regard, the display 151 may have an inter-layered structure or integrally formed with a touch sensor to implement a touch screen. The touch screen may function as the user input unit 123 which provides an input interface between the electronic device 100 and the user and simultaneously provide an output interface between the electronic device 100 and a user. For example, the display 151 may include a liquid crystal display (LCD), a light emitting diode (LED) display, an organic light emitting diode (OLED) display, or a micro electro mechanical system (MEMS) display, or an electronic paper display. For example, the display 151 may display various types of content (e.g., text, an image, a video, an icon, and/or a symbol) to the user. The display 151 may include a touch screen, and may receive, for example, a touch, gesture, proximity, or hovering input using an electronic pen or a part of the user's body.

Meanwhile, the display 151 may include a touch panel 151a, a hologram device 151b, a projector 151c, and/or a control circuit for controlling them. In this regard, the panel may be implemented to be flexible, transparent, or wearable. The panel may include the touch panel 151a and one or more modules. The hologram device 151b may display a stereoscopic image in the air by using the interference of light. The projector 151c may project light onto a screen to display an image. The screen may be located inside or outside the electronic device 100, for example.

The audio module 152 may be configured to interwork with a receiver 152a, a speaker 152b, and a microphone 152c. Meanwhile, the haptic module 153 may convert an electrical signal into a mechanical vibration, and generate a vibration or a haptic effect (e.g., pressure, texture). The electronic device may include, for example, a mobile TV support device (e.g., GPU) capable of processing media data according to standards such as digital multimedia broadcasting (DMB), digital video broadcasting (DVB), MediaFlow or the like. Furthermore, the indicator 154 may display a specific state of the electronic device 100 or a part thereof (e.g., the processor 180), for example, a booting state, a message state, a charging state, or the like.

A wired communication module 160, which may be implemented as an interface unit, functions as a path to various types of external devices connected to the electronic device 100. The wired communication module 160 may include an HDMI 162, a USB 162, a connector/port 163, an optical interface 164, a D-sub (D-subminiature) 165, or the like. Furthermore, the wired communication module 160 may include at least one of wired or wireless headset ports, external power supply ports, wired or wireless data ports, memory card ports, ports for connecting a device having an identification module, audio input/output (I/O) ports, video input/output (I/O) ports, earphone ports, or the like. The electronic device 100 may perform appropriate control related to an external device connected thereto in response to the external device being connected to the wired communication module 160.

The memory 170 is typically implemented to store data to support various functions or features of the electronic device 100. For instance, the memory 170 may be configured to store application programs executed in the electronic device 100, data or instructions for operations of the electronic device 100, and the like. At least some of these application programs may be downloaded from an external server (e.g., a first server 310 or a second server 320) through wireless communication. Other application programs may be installed within the electronic device 100 at the time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the processor 180 to perform an operation (or function) for the electronic device 100.

In this regard, the first server 310 may be referred to as an authentication server, and the second server 320 may be referred to as a content server. The first server 310 and/or the second server 320 may interface with an electronic device through a base station. Meanwhile, a portion of the second server 320 corresponding to the content server may be implemented as a mobile edge cloud (MEC) 330 in units of base stations. Accordingly, a distributed network may be implemented through the second server 320 implemented as the mobile edge cloud (MEC) 330 to shorten a content transmission delay.

The memory 170 may include a volatile and/or a nonvolatile memory. Furthermore, the memory 170 may include an internal memory 170a and an external memory 170b. The memory 170 may store, for example, commands or data related to at least one other component of the electronic device 100. According to one embodiment, the memory 170 may store software and/or a program 240. For example, the program 240 may include a kernel 171, middleware 172, an application programming interface (API) 173, an application program (or "application") 174, or the like. At least a part of the kernel 171, the middleware 172, or the API 174 may be referred to as an operating system (OS).

The kernel 171 may control or mange system resources (e.g., a bus, the memory 170, the processor 180, etc.) used to execute operations or functions implemented in other programs (e.g., the middleware 172, the application programming interface (API) 173, or the application program 174). In addition, the kernel 171 may provide an interface capable of controlling or managing system resources by accessing individual components of the electronic device 100 from the middleware 172, the API 173, or the application program 174.

The middleware 172 may play an intermediary role such that the API 173 or the application program 174 communicates with the kernel 171 to send and receive data. Furthermore, the middleware 172 may process one or more work requests received from the application program 247 according to priority. In one embodiment, the middleware 172 may give a priority capable of using the system resource (e.g., the bus, the memory 170, the processor 180, etc.) of the electronic device 100 to at least one of the application programs 174 to process one or more work requests. The API 173, which is an interface for the application program 174 to control a function provided by the kernel 171 or the middleware 1723, may include, for instance, at least one interface or function (e.g., command) for file control, window control, image processing, text control, or the like.

The processor 180 typically functions to control an overall operation of the electronic device 100, in addition to the operations associated with the application programs. The processor 180 may provide or process information or functions appropriate for a user by processing signals, data, information and the like, which are input or output by the foregoing components, or executing application programs stored in the memory 170. Furthermore, the processor 180 may control at least part of the components illustrated in FIGS. 1 and 2A, in order to execute the application programs stored in the memory 170. In addition, the processor 180 may control a combination of at least two of those components included in the electronic device 100 to activate the application program.

The processor 180 may include one or more of a central processing unit (CPU), an application processor (AP), an image signal processor (ISP), a communication processor (CP), and a low-power processor (e.g., a sensor hub). For example, the processor 180 may execute an operation or data processing related to control and/or communication of at least one other component of the electronic device 100.

The power supply unit 190 may be configured to receive external power or provide internal power in order to supply appropriate power required for operating elements and components included in the electronic device 100, under the control of the processor 180. The power supply unit 190 includes a power management module 191 and a battery 192, and the battery 192 may be a built-in battery or a replaceable battery. The power management module 191 may include a power management integrated circuit (PMIC), a charger IC, or a battery or fuel gauge. The PMIC may have a wired and/or wireless charging method. The wireless charging method includes, for example, a magnetic resonance method, a magnetic induction method or an electromagnetic wave method, and may further include an additional circuit for wireless charging, for example, a coil loop, a resonance circuit, a rectifier, or the like. The battery gauge may measure, for example, the remaining amount, voltage, current, or temperature during charging of a battery 396. For example, battery 192 may include a rechargeable cell and/or a solar cell.

Each of an external device 100a, the first server 310, and the second server 320 may be the same or a different type of device (e.g., an external device or a server) as the electronic device 100. According to one embodiment, all or a part of operations executed in the electronic device 100 may be executed by one or more other electronic devices (e.g., the external device 100a, the first server 310, and the second server 320). According to one embodiment, when the electronic device 100 needs to perform a function or service automatically or upon request, the electronic device 100 may request at least some functions related thereto to other devices (e.g., the external device 100a, the first server 310, and the second server 320) instead of performing the function or service by itself. Other electronic devices (e.g., the external device 100a, the first server 310, and the second server 320) may execute a requested function or an additional function, and transmit the result to the electronic device 201. The electronic device 100 may provide the requested function or service by processing the received result as it is or additionally. For this purpose, for example, cloud computing, distributed computing, client-server computing, or mobile edge cloud (MEC) technology may be used.

At least part of the components may cooperatively operate to implement an operation, a control or a control method of an electronic device according to various implementations disclosed herein. Also, the operation, the control or the control method of the electronic device may be implemented on the electronic device by an activation of at least one application program stored in the memory 170.

Referring to FIG. 1, a wireless communication system may include an electronic device 100, at least one external device 100a, a first server 310, and a second server 320. The electronic device 100 may be functionally connected to at least one external device 100a to control content or functions of the electronic device 100 based on information received from the at least one external device 100a. According to one embodiment of the present disclosure, the electronic device 100 may perform authentication to determine whether the at least one external device 100 includes or generates information following a predetermined rule using the servers 310, 320. Furthermore, the electronic device 100 may display content or control functions differently by controlling the electronic device 100 based on the authentication result. According to an embodiment of the present disclosure, the electronic device 100 may be connected to at least one external device 100a through a wired or wireless communication interface to receive or transmit information. For example, the electronic device 100 and the at least one external device 100a may receive and transmit information in a manner such as near field communication (NFC), a charger (e.g., universal serial bus (USB)-C)), an ear jack, BT (Bluetooth) or WiFi (wireless fidelity).

The electronic device 100 may include at least one of an external device authentication module 100-1, a content/function/policy information DB 100-2, an external device information DB 100-3, or a content DB 104. The at least one external device 100a, as an assistant apparatus associated with the electronic device 100, may be a device designed for various purposes, such as ease of use, increased appearance aesthetics, and enhanced usability of the electronic device 100. The at least one external device 100a may or may not be in physical contact with the electronic device 100.

According to one embodiment, the at least one external device 100a may be functionally connected to the electronic device 100 using a wired/wireless communication module to control information for controlling content or a function in the electronic device 100.

On the other hand, the first server 310 may include a server or a cloud device for a service associated with the at least one external device 100a, or a hub device for controlling a service in a smart home environment. The first server 310 may include at least one of an external device authentication module 311, a content/function/policy information DB 312, an external device information DB 313, and an electronic device/user DB 314. The first server 310 may be referred to as an authentication management server, an authentication server, or an authentication related server. The second server 320 may include a server or cloud device for providing a service or content, or a hub device for providing a service in a smart home environment. The second server 320 may include at least one of a content DB 321, an external device specification information DB 322, a content/function/policy information management module 323, and a device/user authentication/management module 324. The second server 130 may be referred to as a content management server, a content server, or a content related server.

Referring to FIGS. 2B and 2C, the electronic device 100 disclosed herein has a bar-type terminal body. However, the present disclosure may not be necessarily limited to this, and may be also applicable to various structures such as a watch type, a clip type, a glasses type, a folder type in which two or more bodies are coupled to each other in a relatively movable manner, a slide type, a swing type, a swivel type, and the like. Discussion herein will often relate to a particular type of electronic device. However, such teachings with regard to a particular type of electronic device will generally be applied to other types of electronic devices as well.

Here, considering the electronic device 100 as at least one assembly, the terminal body may be understood as a conception referring to the assembly.

The electronic device 100 will generally include a case (for example, frame, housing, cover, and the like) forming the appearance of the terminal. In this implementation, the electronic device 100 may include a front case 101 and a rear case 102. Various electronic components may be incorporated into a space formed between the front case 101 and the rear case 102. At least one middle case may be additionally positioned between the front case 101 and the rear case 102.

A display 151 may be disposed on a front surface of the terminal body to output information. As illustrated, a window 151a of the display 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed. Meanwhile, a portion of a side surface of the rear case 102 may be implemented to operate as a radiator.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121b or an audio output module 152b.

Referring to FIGS. 2A to 2C, the electronic device 100 may include a display 151, first and second audio output modules 152a, 152b, a proximity sensor 141, an illumination sensor 152, an optical output module 154, first and second cameras 121a, 121b, first and second manipulation units 123a, 123b, a microphone 152c, a wired communication module 160, and the like.

The display 151 is generally configured to output information processed in the electronic device 100. For example, the display 151 may display execution screen information of an application program executing at the electronic device 100 or user interface (UI) and graphic user interface (GUI) information in response to the execution screen information.

The display 151 may be implemented using two display devices, according to the configuration type thereof. For instance, a plurality of the displays 151 may be arranged on one side, either spaced apart from each other, or these devices may be integrated, or these devices may be arranged on different surfaces.

The display 151 may include a touch sensor which senses a touch onto the display so as to receive a control command in a touching manner. When a touch is input to the display 151, the touch sensor may be configured to sense this touch and the processor 180 may generate a control command corresponding to the touch. The content input by the touch method may be a text or numerical value, or a menu item capable of indication or designation in various modes.

In this manner, the display 151 may define a flexible touch screen along with the touch sensor, and in this case, the touch screen may function as the user input unit 123. Therefore, the touch screen may replace at least part of the functions of the first manipulation unit 123a.

The first audio output module 152a may be implemented in the form of a receiver for transferring voice sounds to the user's ear or a loud speaker for outputting various alarm sounds or multimedia reproduction sounds.

The optical output module 154 may output light for indicating an event generation. Examples of the event generated in the electronic device 100 may include a message reception, a call signal reception, a missed call, an alarm, a schedule notice, an email reception, information reception through an application, and the like. When a user's event check is sensed, the processor 180 may control the optical output unit 154 to end the output of light.

The first camera 121a may process video frames such as still or moving images acquired by the image sensor in a video call mode or a capture mode. The processed video frames may be displayed on the display 151 or stored in the memory 170.

The first and second manipulation units 123a and 123b are examples of the user input unit 123, which may be manipulated by a user to provide input to the electronic device 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

On the other hand, the electronic device 100 may include a finger scan sensor which scans a user's fingerprint. The processor 180 may use fingerprint information sensed by the finger scan sensor as an authentication means. The finger scan sensor may be embedded into the display 151 or the user input unit 123.

The wired communication module 160 may serve as a path allowing the electronic device 100 to interface with external devices. For example, the wired communication module 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the electronic device 100. The wired communication module 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a. The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained. The flash 125 may be disposed adjacent to the second camera 121b. When an image of a subject is captured with the camera 121b, the flash 125 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication. Furthermore, the microphone 152c may be configured to receive the user's voice, other sounds, and the like. The microphone 152c may be provided at a plurality of places, and configured to receive stereo sounds.

At least one antenna for wireless communication may be disposed on the terminal body. The antenna may be embedded into the terminal body or implemented on the case. Meanwhile, a plurality of antennas connected to the 4G wireless communication module 111 and the 5G wireless communication module 112 may be arranged on a side surface of the terminal. Alternatively, an antenna may be formed in a form of film to be attached onto an inner surface of the rear cover 103 or a case including a conductive material may serve as an antenna.

Meanwhile, the plurality of antennas arranged on a side surface of the terminal may be implemented with four or more antennas to support MIMO. In addition, when the 5G wireless communication module 112 operates in a millimeter wave (mmWave) band, as each of the plurality of antennas is implemented as an array antenna, a plurality of array antennas may be arranged in the electronic device.

The terminal body is provided with a power supply unit 190 for supplying power to the electronic device 100. The power supply unit 190 may include a batter 191 which is mounted in the terminal body or detachably coupled to an outside of the terminal body.

Hereinafter, a multi-communication system structure and an electronic device including the same according to an embodiment, particularly embodiments related to an antenna and an electronic device including the same in a heterogeneous radio system, will be described with reference to the accompanying drawings. It should be understood by those skilled in the art that the present disclosure can be embodied in other specific forms without departing from the concept and essential characteristics thereof.

Meanwhile, a detailed operation and function of an electronic device having a plurality of antennas according to an embodiment provided with the 4G/5G wireless communication module as shown in FIG. 2A will be described below.

In a 5G communication system according to an embodiment, a 5G frequency band may be a higher frequency band than a sub-6 band. For example, the 5G frequency band may be a millimeter wave band, but the present disclosure is not limited thereto and may be changed according to an application.

Figure 3A:
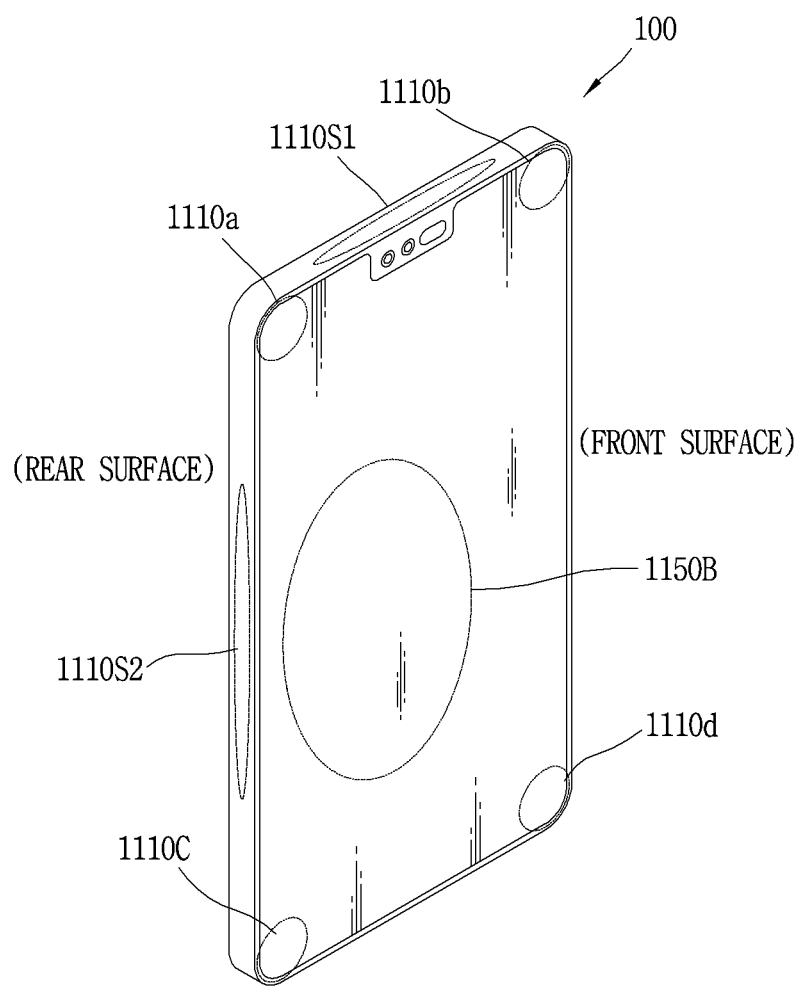
FIG. 3A shows an example of a configuration in which a plurality of antennas in an electronic device according to an embodiment can be disposed.

FIG. 3A shows an example of a configuration in which a plurality of antennas in an electronic device according to an embodiment can be disposed. Referring to FIG. 3A, a plurality of antennas 1110a to 1110d may be arranged on an inner side of or a front surface of the electronic device 100. In this regard, the plurality of antennas 1110a to 1110d may be implemented in a form printed on a carrier in an electronic device or in a system-on-chip (Soc) form along with an RFIC. Meanwhile, the plurality of antennas 1110a to 1110d may be disposed on a front surface of the electronic device in addition to an inner side of the electronic device. In this regard, the plurality of antennas 1110a to 1110d disposed on a front surface of the electronic device 100 may be implemented as transparent antennas embedded into a display.

Meanwhile, a plurality of antennas 1110S1 and 1110S2 may be disposed on a side surface of the electronic device 100. In this regard, a 4G antenna may be disposed on a side surface of the electronic device 100 in the form of a conductive member, and a slot may be disposed in a conductive member region, and the plurality of antennas 1110a to 1110d may be configured to radiate 5G signals through the slot. Furthermore, antennas 1150B may be arranged on a rear surface of the electronic device 100 to radiate 5G signals to the back.

Meanwhile, the present disclosure may transmit or receive at least one signal through the plurality of antennas 1110S1 and 1110S2 on a side surface of the electronic device 100. In addition, the present disclosure may transmit or receive at least one signal through the plurality of antennas 1110a to 1110d, 1150B, 1110S1, and 1110S2 on a front and/or side surface of the electronic device 100. The electronic device may communicate with the base station through any one of the plurality of antennas 1110a to 1110d, 1150B, 1110S1 and 1110S2. Alternatively, the electronic device may perform multi-input multi-output (MIMO) communication with the base station through two or more antennas among the plurality of antennas 1110a to 1110d, 1150B, 1110S1 and 1110S2.

Figure 3B:
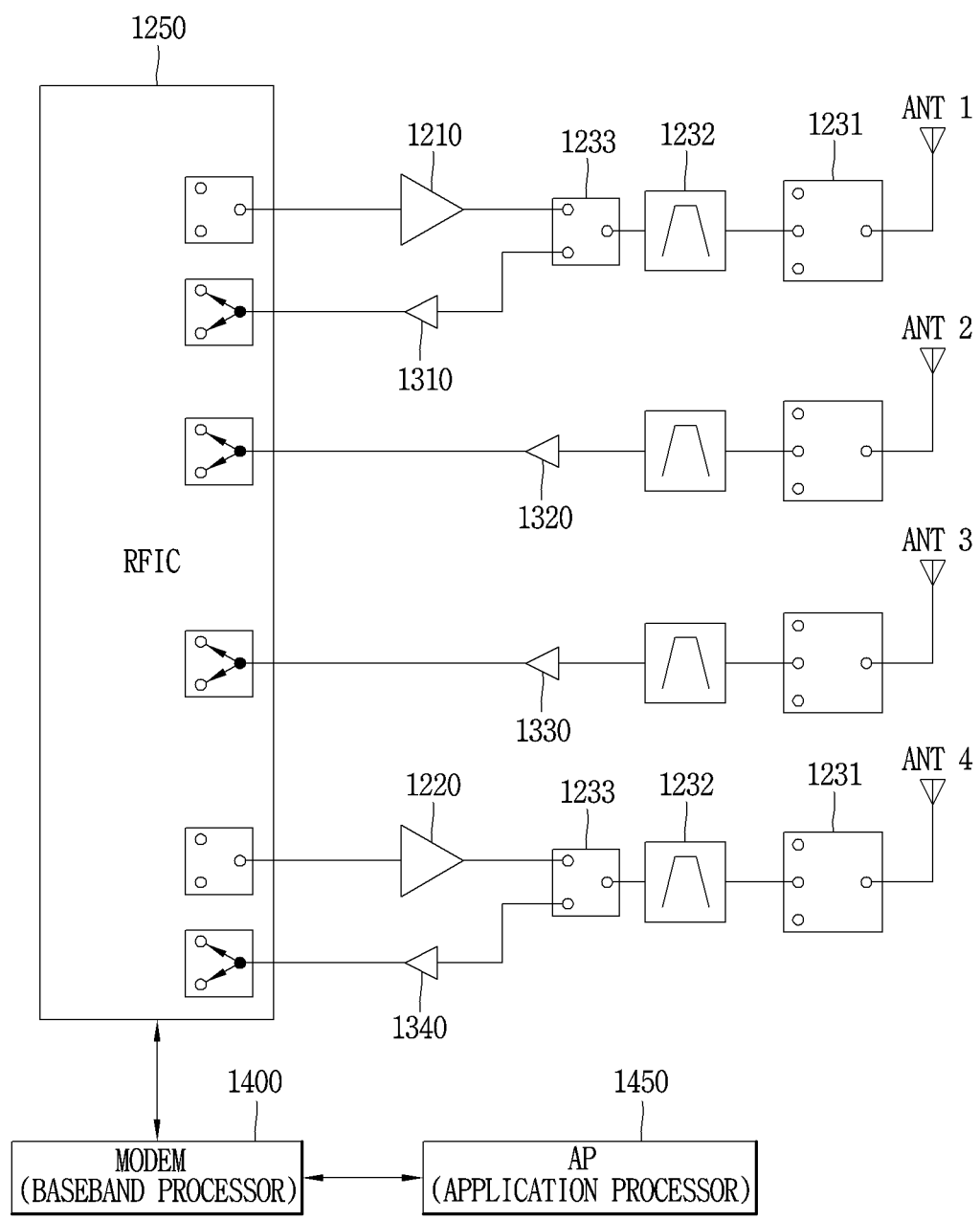
FIG. 3B illustrates a configuration of a wireless communication unit of an electronic device operable in a plurality of wireless communication systems according to an embodiment.

FIG. 3B illustrates a configuration of a wireless communication unit of an electronic device operable in a plurality of wireless communication systems according to an embodiment. Referring to FIG. 3B, the electronic device includes a first power amplifier 1210, a second power amplifier 1220, and an RFIC 1250. In addition, the electronic device may further include a modem 400 and an application processor (AP) 500. Here, the modem 400 and the application processor (AP) 500 may be physically implemented on a single chip, and may be implemented in a logical and functionally separated form. However, the present disclosure is not limited thereto and may be implemented in the form of a chip that is physically separated according to an application.

Meanwhile, the electronic device includes a plurality of low noise amplifiers (LNAs) 410 to 440 in the receiver. Here, the first power amplifier 1210, the second power amplifier 1220, the RFIC 1250, and the plurality of low noise amplifiers 310 to 340 are all operable in a first communication system and a second communication system. In this case, the first communication system and the second communication system may be a 4G communication system and a 5G communication system, respectively.

As illustrated in FIG. 3B, the RFIC 1250 may be configured as a 4G/5G integration type, but is not limited thereto, and may also be configured as a 4G/5G separation type according to an application. When the RFIC 1250 is configured as a 4G/5G integrated type, it is advantageous in terms of synchronization between 4G/5G circuits, and also there is an advantage capable of simplifying control signaling by the modem 1400.

On the other hand, when the RFIC 1250 is configured as the 4G/5G separated type, the separated RFIDs may be referred to as 4G RFIC and 5G RFIC, respectively. In particular, when a band difference between the 5G band and the 4G band is large, such as when the 5G band is configured as a millimeter wave band, the RFIC 1250 may be configured as a 4G/5G separation type. As such, when the RFIC 1250 is configured as a 4G/5G separation type, there is an advantage that the RF characteristics can be optimized for each of the 4G band and the 5G band.

Meanwhile, even when the RFIC 1250 is configured as a 4G/5G separation type, the 4G RFIC and the 5G RFIC may be logically and functionally separated but physically implemented on a single chip.

On the other hand, the application processor (AP) 1450 is configured to control the operation of each component of the electronic device. Specifically, the application processor (AP) 1450 may control the operation of each component of the electronic device through the modem 1400.

For example, the modem 1400 may be controlled through a power management IC (PMIC) for low power operation of the electronic device. Accordingly, the modem 1400 may operate the power circuits of the transmitter and the receiver in a low power mode through the RFIC 1250.

In this regard, when it is determined that the electronic device is in an idle mode, the application processor (AP) 500 may control the RFIC 1250 through the modem 300 as follows. For example, when the electronic device is in an idle mode, the application processor 280 may control the RFIC 1250 through the modem 300, such that at least one of the first and second power amplifiers 110 and 120 operates in the low power mode or is turned off.

According to another implementation, the application processor (AP) 500 may control the modem 300 to provide wireless communication capable of performing low power communication when the electronic device is in a low battery mode. For example, when the electronic device is connected to a plurality of entities among a 4G base station, a 5G base station, and an access point, the application processor (AP) 1450 may control the modem 1400 to enable wireless communication at the lowest power. Accordingly, the application processor (AP) 500 may control the modem 1400 and the RFIC 1250 to perform short-range communication using only the short-range communication module 113, even at the expense of throughput.

According to another implementation, when the remaining battery level of the electronic device is above a threshold value, the modem 300 may be controlled to select an optimal wireless interface. For example, the application processor (AP) 1450 may control the modem 1400 to receive data through both the 4G base station and the 5G base station according to the remaining battery level and the available radio resource information. In this case, the application processor (AP) 1450 may receive the remaining battery information from the PMIC, and the available radio resource information from the modem 1400. Accordingly, when the remaining battery level and the available radio resources are sufficient, the application processor (AP) 500 may control the modem 1400 and the RFIC 1250 to receive data through both the 4G base station and 5G base station.

Meanwhile, the multi-transceiving system of FIG. 3B may integrate a transmitter and a receiver of each radio system into a single transceiver. Accordingly, there is an advantage in that a circuit portion for integrating two types of system signals may be eliminated at a RF front-end.

Furthermore, since the front end parts can be controlled by an integrated transceiver, the front end parts may be more efficiently integrated than when the transceiving system is separated by communication systems.

In addition, when separated by communication systems, it may be impossible to control other communication systems as required, or impossible to perform efficient resource allocation since system delay increases due to this. On the contrary, the multi-transceiving system as shown in FIG. 2 may control other communication systems as needed, thereby minimizing system delay due to this, and thus there is an advantage in that efficient resource allocation is possible.

Meanwhile, the first power amplifier 1210 and the second power amplifier 1220 may operate in at least one of the first and second communication systems. In this regard, when the 5G communication system operates in a 4G band or a sub-6 band, the first and second power amplifiers 1210 and 1220 may operate in both the first and second communication systems.

On the contrary, when the 5G communication system operates in a millimeter wave (mmWave) band, the first and second power amplifiers 1210, 1220 may operate in either the 4G band and the other in the millimeter wave band.

On the other hand, a transmitter and a receiver may be integrated to implement two different wireless communication systems using a single antenna using a dual transmit/receive antenna. Here, 4×4 MIMO may be implemented using four antennas as shown in FIG. 2. In this case, 4×4 DL MIMO may be performed through downlink (DL).

Meanwhile, when the 5G band is a sub-6 band, first to fourth antennas (ANT1 to ANT4) may be configured to operate in both the 4G band and the 5G band. On the contrary, when the 5G band is a millimeter wave (mmWave) band, the first to fourth antennas (ANT1 to ANT4) may be configured to operate in either one of the 4G band and the 5G band. In this case, when the 5G band is a millimeter wave (mmWave) band, a plurality of separate antennas may be individually configured as an array antenna in the millimeter wave band.

Meanwhile, 2×2 MIMO may be implemented using two antennas connected to the first power amplifier 1210 and the second power amplifier 1220 among the four antennas. In this case, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented with 1 Tx, only one of the first and second power amplifiers 1210, 1220 may operate in the 5G band. Meanwhile, when the 5G communication system is implemented with 4Tx, an additional power amplifier operating in the 5G band may be further provided. Alternatively, a transmission signal may be branched in each of one or two transmission paths, and the branched transmission signal may be connected to a plurality of antennas.

On the other hand, a switch-type splitter or power divider is integrated into the RFIC corresponding to the RFIC 1250, and an additional component does not need to be disposed externally, thereby improving component mountability. In more detail, a single pole double throw (SPDT) type switch may be provided in the RFIC corresponding to the controller 1250 to select transmitters (TXs) of two different communication systems.

Also, the electronic device operable in the plurality of wireless communication systems according to an embodiment may further include a duplexer 1231, a filter 1232, and a switch 1233.

The duplexer 1231 is configured to separate signals in a transmission band and a reception band from each other. In this case, signals in a transmission band transmitted through the first and second power amplifiers 1210, 1220 are applied to the antennas (ANT1, ANT4) through a first output port of the duplexer 1231. On the contrary, a signal in a reception band received through the antennas (ANT1, ANT4) are received by the low noise amplifiers 310, 340 through a second output port of the duplexer 1231.

The filter 1232 may be configured to pass signals in a transmission band or a reception band and block signals in the remaining bands. In this case, the filter 1232 may include a transmission filter connected to the first output port of the duplexer 1231 and a reception filter connected to the second output port of the duplexer 1231. Alternatively, the filter 1232 may be configured to pass only signals in the transmission band or only signals in the reception band according to a control signal.

The switch 1233 is configured to transmit only one of the transmission signal and the reception signal. In an embodiment of the present disclosure, the switch 1233 may be configured in a single-pole double-throw (SPDT) type to separate a transmission signal and a reception signal in a time division duplex (TDD) scheme. Here, the transmission signal and the reception signal are signals of the same frequency band, and thus the duplexer 1231 may be implemented in the form of a circulator.

Meanwhile, in another embodiment of the present disclosure, the switch 1233 may also be applicable to a frequency division duplex (FDD) scheme. In this case, the switch 1233 may be configured in the form of a double-pole double-throw (DPDT) to connect or block a transmission signal and a reception signal, respectively. On the other hand, the transmission signal and the reception signal may be separated by the duplexer 1231, and thus the switch 1233 is not necessarily required.

Meanwhile, the electronic device according to an embodiment may further include a modem 1400 corresponding to the controller. In this case, the RFIC 1250 and the modem 1400 may be referred to as a first controller (or a first processor) and a second controller (a second processor), respectively. On the other hand, the RFIC 1250 and the modem 1400 may be implemented as physically separated circuits. Alternatively, the RFIC 1250 and the modem 1400 may be logically or functionally divided into a single circuit.

The modem 1400 may perform control and signal processing for the transmission and reception of signals through different communication systems through the RFIC 1250. The modem 1400 may be acquired through control information received from the 4G base station and/or the 5G base station. Here, the control information may be received through a physical downlink control channel (PDCCH), but the present disclosure is not limited thereto.

The modem 1400 may control the RFIC 1250 to transmit and/or receive signals through the first communication system and/or the second communication system at specific time and frequency resources. Accordingly, the RFIC 1250 may control transmission circuits including the first and second power amplifiers 1210, 1220 to transmit 4G or 5G signals in a specific time interval. In addition, the RFIC 1250 may control reception circuits including first through fourth low-noise amplifiers 1310 to 1340 to receive 4G or 5G signals in a specific time interval.

On the other hand, in the electronic device shown in FIGS. 1A to 2B, a specific configuration and function of the electronic device including an antenna disposed inside the electronic device as shown in FIG. 3A and a multi-transceiving system as shown in FIG. 3B will be described below. In this regard, the present specification will be described with respect to an electronic device including a transparent antenna having an optimized structure. In relation to an electronic device including a transparent antenna having such an optimized structure, an aspect of the present disclosure is to improve the radiation efficiency of a transparent antenna provided in an electronic device or a vehicle.

Another aspect of the present disclosure is to provide a transparent antenna structure having a wide radiation efficiency band for vehicle and mobile communication using a 5G Sub6 band. In this regard, it aims to develop a transparent antenna with a wide radiation efficiency band (3-6 GHZ) for 5G vehicle and mobile communication.

Still another aspect of the present disclosure is to provide an antenna structure for providing an optimal radiation efficiency for each different band. In this regard, in the related art, since a transparent electrode has a large loss, it is difficult to have a high radiation efficiency in a wide band.

Yet still another aspect of the present disclosure is to provide multi-input multi-output (MIMO) optimized for each band in a configuration of a plurality of antennas for providing an optimal radiation efficiency for each different band.

Still yet another aspect of the present disclosure is to provide carrier aggregation optimized for a combination of a plurality of bands in a configuration of a plurality of antennas for providing an optimal radiation efficiency for each different band.

Figure 4:
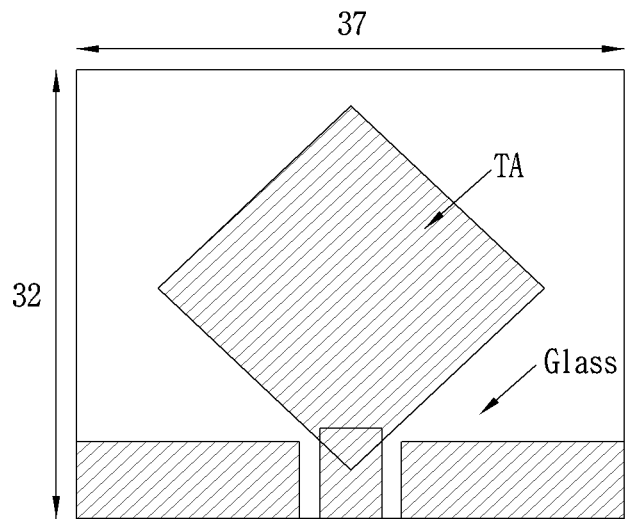
FIG. 4 shows the structures of different types of transparent antennas.
Figure 4:
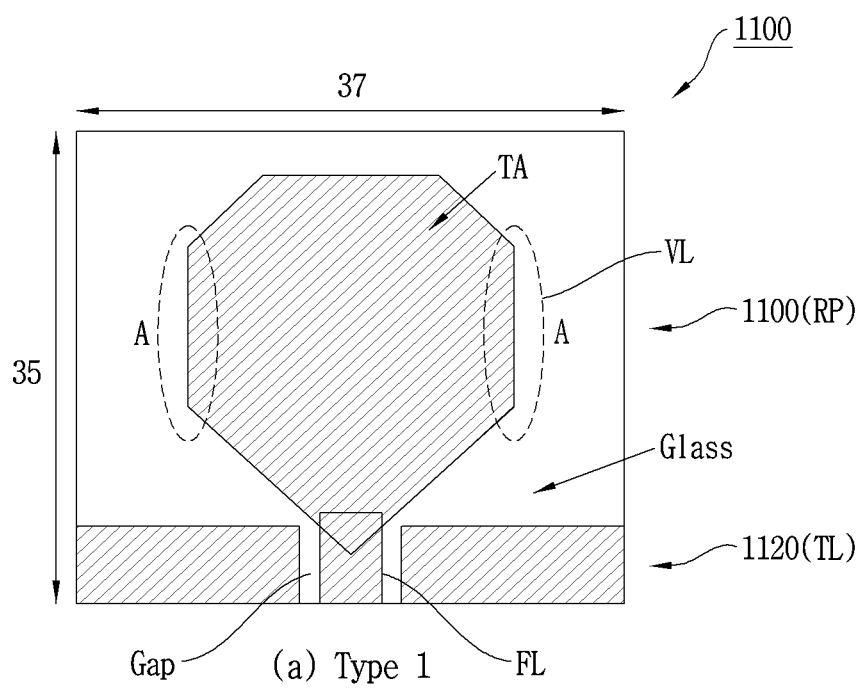

In order to achieve the foregoing object, various types of transparent antenna structures may be considered. In this regard, FIG. 4 shows the structures of different types of transparent antennas. FIG. 4(*a*) shows a transparent antenna in a state in which a rectangular patch is rotated at a predetermined angle. On the contrary, FIG. 4(*b*) shows a transparent antenna in which vertical lines VL are defined in left and right regions of the rectangular patch in a state in which the rectangular patch is rotated at a predetermined angle. Here, the transparent antenna (TA) may be made of a transparent conducting oxide (TCO), a silver nanowire, carbon nanotube (CNT), graphene, a conductive polymer, an indium tin oxide (ITO) thin film.

In this regard, the transparent antenna (TA) by a TCO process may be made by performing a process of depositing a transparent electrode on glass as a single layer to define an antenna shape. Accordingly, the transparent antenna (TA) by the TCO process operates as an antenna that forms an electric field due to a potential difference between a ground portion and a radiator included in a feeding structure to radiate the electric field.

Referring to FIG. 4(*a*), the antenna is configured with a transparent antenna (TA) made of a conductive material formed on or inside a substrate made of a glass material. Here, the transparent antenna (TA) may be defined in a state in which a rectangular patch is rotated at a predetermined angle. The transparent antenna (TA) may be connected to a co-planar waveguide-type feeding line to apply a signal to the transparent antenna (TA). As described above, the rectangular patch may be referred to as a Type 0 antenna in a state of being rotated at a predetermined angle on or inside the substrate made of a glass material.

Referring to FIG. 4(*b*), the antenna 1100 is configured with a transparent antenna (TA) made of a conductive material formed on or inside the substrate made of a glass material. Here, the transparent antenna (TA) may be defined in a state in which a rectangular patch is rotated at a predetermined angle. For an example, the transparent antenna (TA) may be embedded into a display or disposed on the display to radiate a signal to a front of the display. In this regard, the transparent antenna (TA) may be configured in the form of a rectangular patch (RP) 1110 rotated at a predetermined angle. Meanwhile, portions of the left and right regions of the rectangular patch (RP) 1110 may be defined as vertical lines VL.

In this regard, a corner of the rectangular patch (RP) 1110 may be defined in a cut structure such that portions of the left and right regions of the rotated rectangular patch (RP) 1110 are defined as vertical lines VL. A rectangular patch antenna in which portions of the left and right regions of the rotated rectangular patch (RP) 1110 are defined as vertical lines VL may be referred to as a Type 1 antenna.

Furthermore, a portion of an upper region of the rotated rectangular patch RP 1110 may be defined as a horizontal line HL. In this regard, a corner of the rectangular patch (RP) 1110 may be defined in a cut structure such that a portion of an upper region of the rotated rectangular patch (RP) 1110 is defined as a horizontal line HL. On the contrary, a corner is not defined in a cut structure in a lower region of the rotated rectangular patch (RP) 1110. In this regard, a lower region of the rotated rectangular patch RP 1110 may be connected to a feeding line (FL) in the form of a transmission line (TL) 1120. A rectangular patch antenna in which portions of the left and right regions of the rotated rectangular patch (RP) 1110 are defined as vertical lines VL and a portion of the upper region is defined as a horizontal line HL may be referred to as a Type 1 antenna.

In this regard, the transmission line (TL) 1120 is configured to feed the transparent antenna. In this regard, the transmission line (TL) 1120 may include a co-planar waveguide-type feeding line (FL) and ground regions GND disposed in left and right regions of the feeding line (FL). A gap may be defined between the feeding line (FL) and the ground region GND to define a co-planar waveguide structure.

According to an embodiment, the transparent antenna (TA) may include the rectangular patch (RP) 1110, the feeding line (FL), and the ground region GND. Here, the feeding line (FL) and the ground region GND may be referred to as a transmission line (TL) 1120. In this regard, the rectangular patch (RP) 1110 may be disposed on the display, and disposed in the form of being rotated at a predetermined angle. The feeding line (FL) may be configured to transmit a signal to the rectangular patch (RP) 1110. The feeding line (FL) may be defined to be connected to connection points at different corners of the rotated rectangular patch (RP) 1110. The ground region GND may be configured to be disposed in a left region and a right region of the feeding line (FL).

Figure 5A:
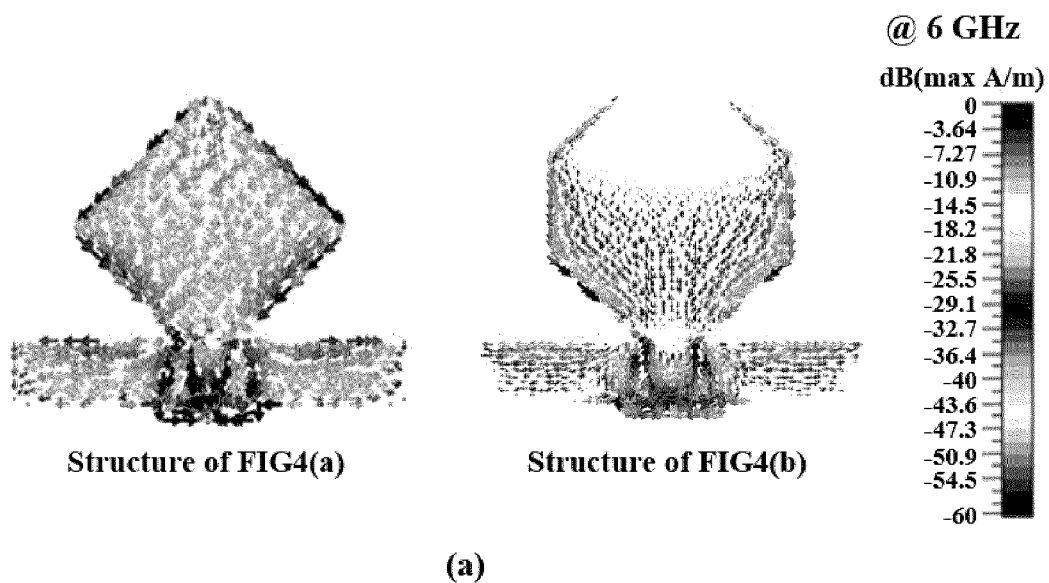
FIG. 5A shows a current distribution formed on a rectangular patch antenna in different types of antennas.
Figure 5A:
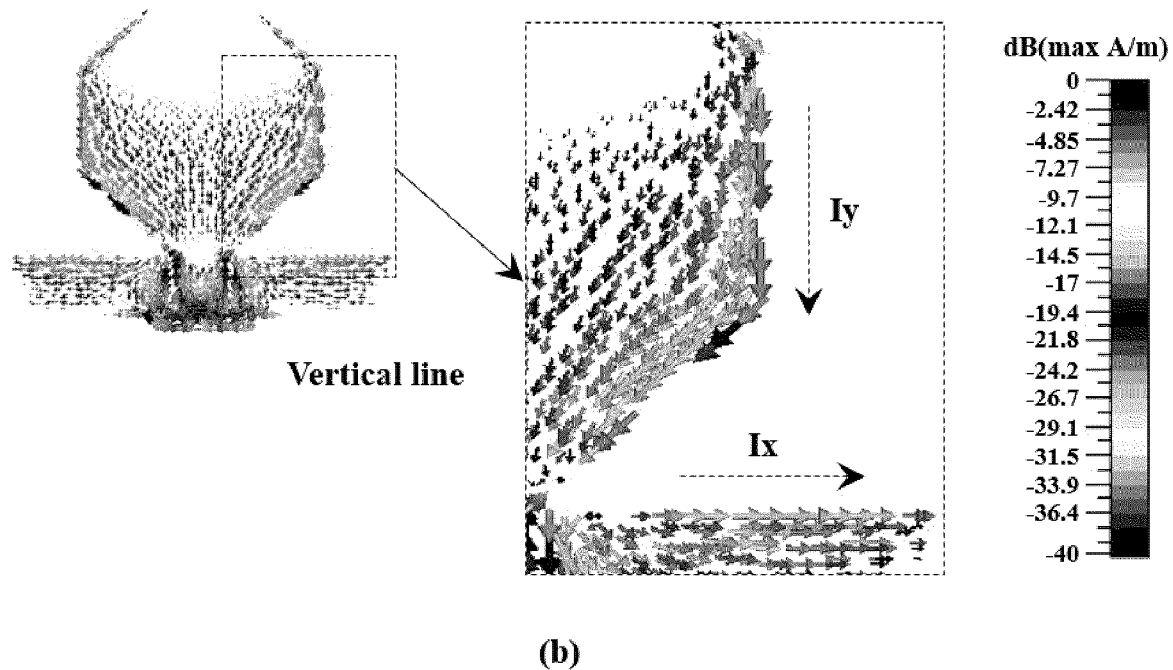

FIG. 5A shows a current distribution formed on a rectangular patch antenna in different types of antennas. Referring to the current distribution formed on the Type 0 antenna of FIG. 4(*a*) in FIG. 5*a*(a), a surface current is weakly formed in left and right edge regions where two corners meet. Due to this, the formation of the electric field is weakened, and antenna radiation is not well performed, so the radiation efficiency is low. In this regard, the Type 0 antenna of FIG. 4(*a*), that is, a rhombus-shaped antenna, is an antenna in which a feeding line is disposed at a corner side to supplement the narrow band characteristic of a general patch antenna.

On the contrary, referring to the current distribution formed on the Type 1 antenna of FIG. 4(*b*) in FIG. 5A(a), a surface current is strongly formed in the left and right edge regions A where two corners meet. Due to this, the formation of the electric field is strengthened, and antenna radiation is well performed, so the radiation efficiency is high. In this regard, the Type 1 antenna of FIG. 4(*b*), that is, a diamond-shaped antenna, has a structure in which the shape of a current formed in the edge region A is generated in a planar structure in the form of a vertical line VL to concentrate the current. In this regard, the vertical line VL defined in the rectangular patch (RP) 1110 may be defined in a direction perpendicular to the current direction of the ground region GND.

On the other hand, referring to FIG. 5A(b), a copper portion having a structure in a direction Iy perpendicular to a current flow direction Ix of the ground region GND increases. That is, as portions of the left and right regions of the rotated rectangular patch RP 1110 are defined as vertical lines VL, a current distribution formed in the direction Iy perpendicular to the current flow direction Ix of the ground region GND increases. The current distribution formed in the direction Iy perpendicular to the current flow direction Ix of the ground region GND increases, so that the Type 1 antenna has a broader bandwidth characteristic than that of the Type 0 antenna.

That is, the antenna 1100 described herein adopts a structure in which an electric field is well formed by removing an edge shape where two corners meet to concentrate a surface current. Due to this, the rotated rectangular patch (RP) 1110 may strongly form a field through the edge region A formed by the vertical line VL to increase the radiation efficiency. Furthermore, a resonance bandwidth of the antenna 1100 may be increased by an electric field formed between the ground region GND and the radiator, that is, the rectangular patch (RP) 1110. Accordingly, as the resonance bandwidth of the antenna 1100 increases, a radiation efficiency bandwidth of the antenna may also increase.

Figure 5B:
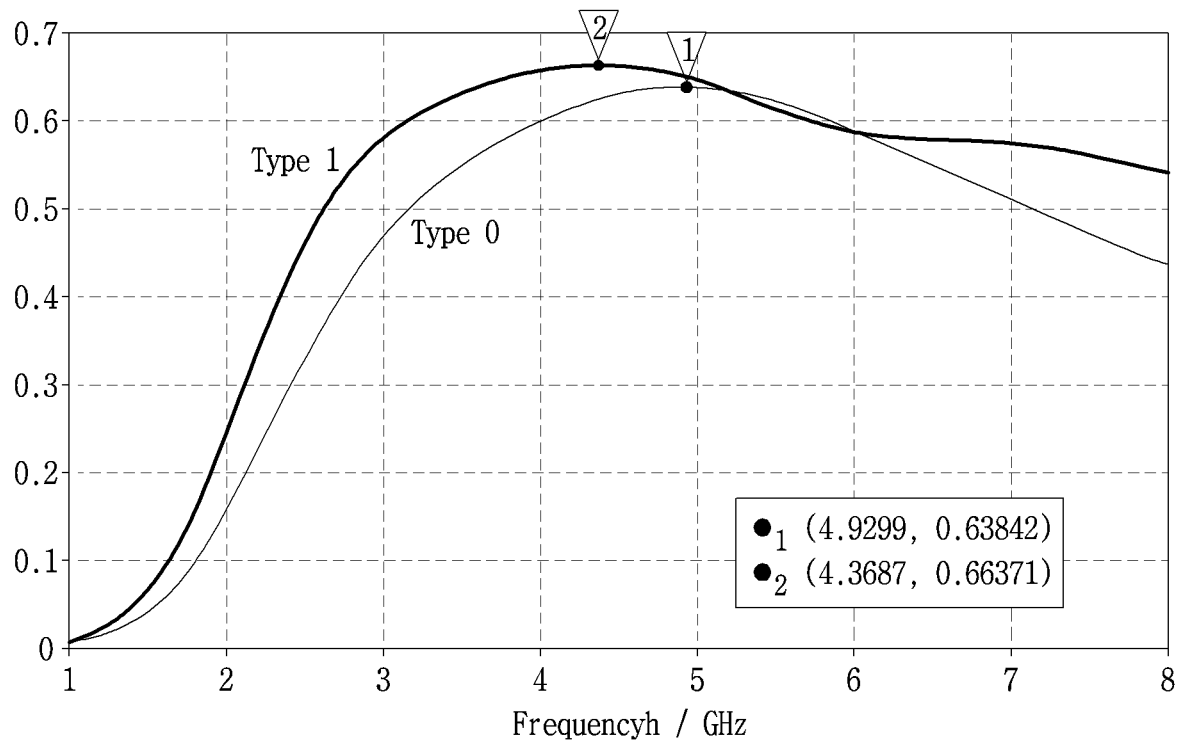
FIG. 5B shows simulation results and measurement results of radiation efficiency bandwidth characteristics of a Type 0 antenna and a Type 1 antenna according to an embodiment.
Figure 5B:
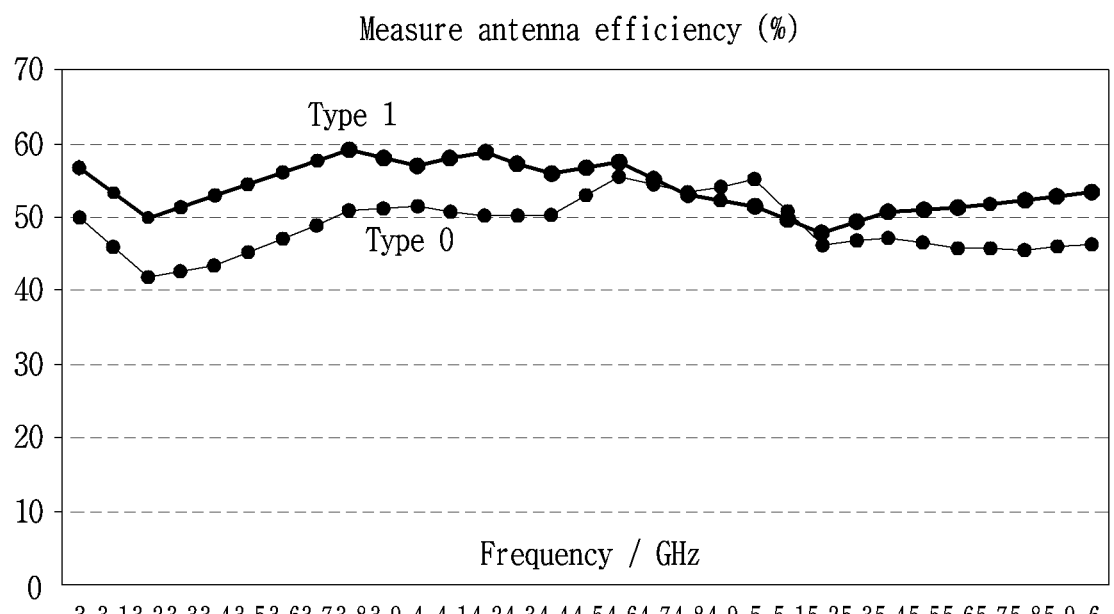

In this regard, the radiation efficiency bandwidth characteristics of the Type 0 antenna and the Type 1 antenna are considered as follows. In this regard, FIG. 5B shows simulation results and measurement results of radiation efficiency bandwidth characteristics of a Type 0 antenna and a Type 1 antenna according to an embodiment. FIG. 5B(a) shows simulation results of radiation efficiency bandwidth characteristics of a Type 0 antenna and a Type 1 antenna according to an embodiment. On the contrary, the FIG. 5B(b) shows measurement results of radiation efficiency bandwidth characteristics of a Type 0 antenna and a Type 1 antenna according to an embodiment.

Referring to FIG. 5B(a), a peak efficiency frequency of the Type 0 antenna is about 4.9 GHz and a peak efficiency frequency of the Type 1 antenna is about 4.3 GHZ. Meanwhile, in a band of about 5.2 GHz or less, the efficiency characteristic of the Type 1 antenna is higher than that of the Type 0 antenna. In this regard, the efficiencies of the Type 0 antenna and the Type 1 antenna are similar in bands above about 5.2 GHz and below 6 GHz. Meanwhile, the efficiency bandwidth of 60% or more can be seen that the Type 1 antenna is wider than the Type 0 antenna. Accordingly, the Type 1 antenna has a higher radiation efficiency than the Type 0 antenna and has better radiation efficiency bandwidth characteristics.

Referring to FIG. 5B(b), it can be seen that the measurement result is also similar to the simulation result. Accordingly, the Type 1 antenna has a higher radiation efficiency than the Type 0 antenna and has better radiation efficiency bandwidth characteristics.

Figure 6A:
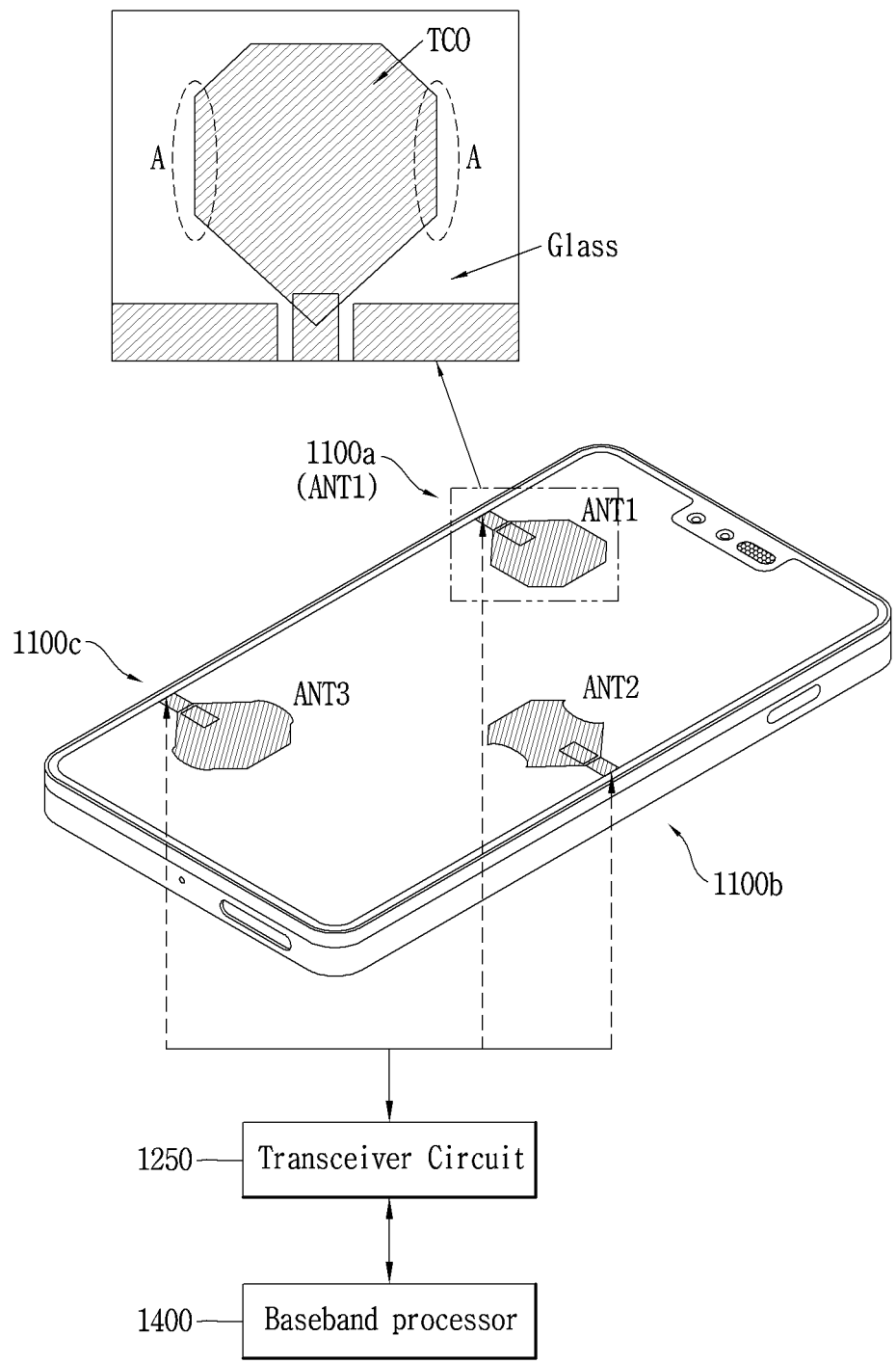
FIG. 6A is a schematic diagram showing a configuration and operation of an electronic device having a plurality of different types of Type 1 antennas according to an embodiment. In addition.
Figure 6B:
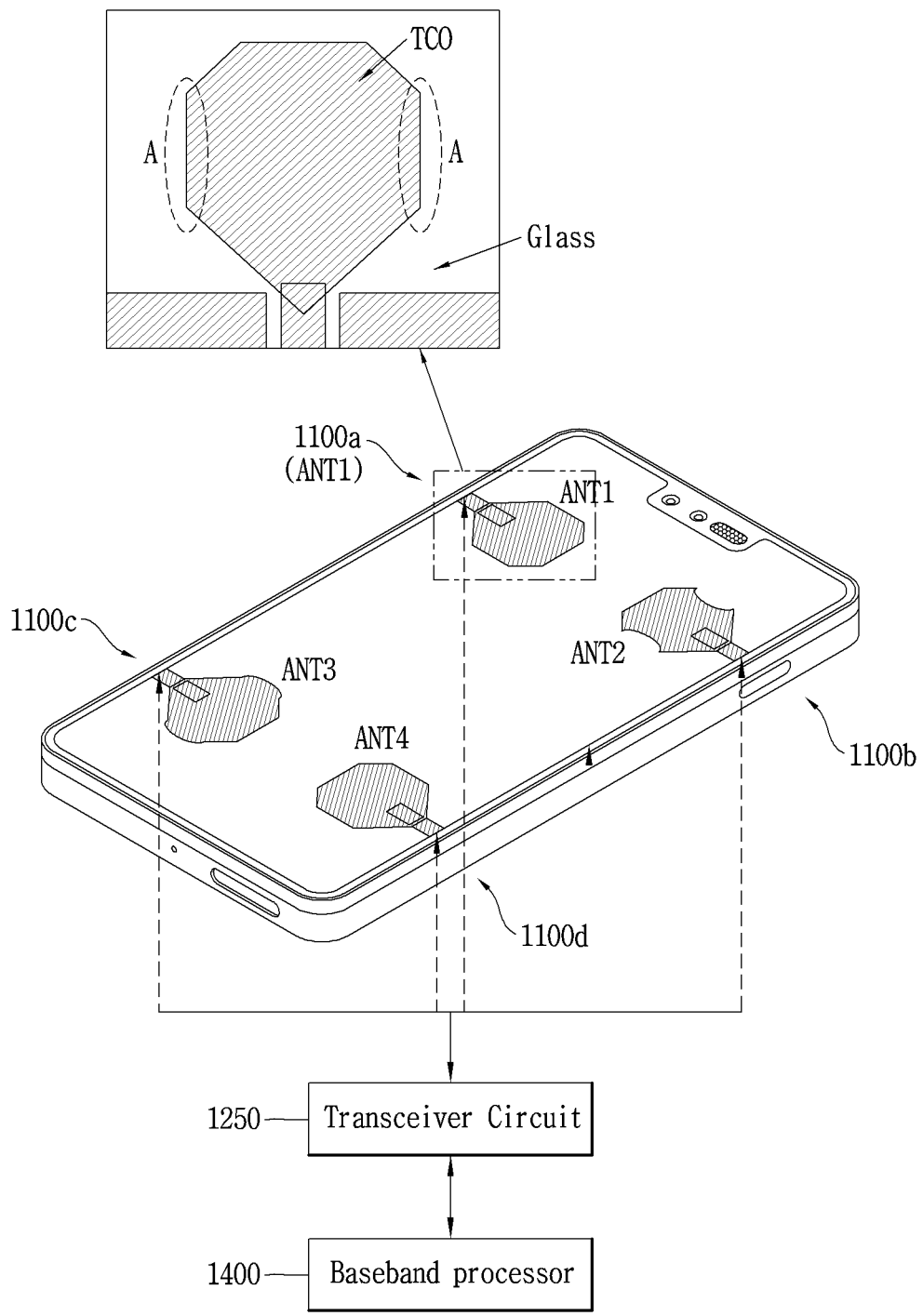
FIG. 6B is a schematic diagram showing a configuration and operation of an electronic device having a plurality of different types of Type 1 antennas according to another embodiment.

Meanwhile, the Type 1 antenna according to an embodiment, that is, an antenna in which a current distribution is strongly formed by a vertical line VL, may also be changed to another shape. In addition, at least one of various types of Type 1 antennas may be implemented as a plurality of antennas. In this regard, FIG. 6A is a schematic diagram showing a configuration and operation of an electronic device having a plurality of different types of Type 1 antennas according to an embodiment. In addition, FIG. 6B is a schematic diagram showing a configuration and operation of an electronic device having a plurality of different types of Type 1 antennas according to another embodiment. FIG. 6B may be a case where two or more Type 1 antennas of at least one type are disposed.

Referring to FIGS. 4 and 6A, the transparent antenna (TA) may be configured with a plurality of antennas 1100*a* to 1100*c* (ANT1 to ANT3) in different regions of the display. In this regard, positions at which the plurality of antennas 1100*a* to 1100*c* (ANT1 to ANT3) are disposed are not limited to FIG. 6A and may be changed according to an application. For an example, the plurality of antennas 1100*a* to 1100*c* (ANT1 to ANT3) may be disposed in upper and lower regions of the display. For another example, the plurality of antennas 1100*a* to 1100*c* (ANT1 to ANT3) may be disposed in any one of upper and left regions, upper and right regions, lower and left regions, and lower and right regions of the display. For another example, the plurality of antennas 1100*a* to 1100*c* (ANT1 to ANT3) may be disposed to be spaced apart from one another by a predetermined distance in any one of upper, lower, left, and right regions of the display.

In the first antenna 1100*a* (ANT1) of the plurality of antennas, portions of a left region and a right region thereof may be defined as vertical lines VL. In the second antenna 1100*b* (ANT2) of the plurality of antennas, partial lines of a left region and a right region thereof may be defined as curves in a concave form. Meanwhile, in the third antenna 1100*c* (ANT3) of the plurality of antennas, partial lines of a left region and a right region thereof may be defined as curves in a convex form.

Figure 7A:
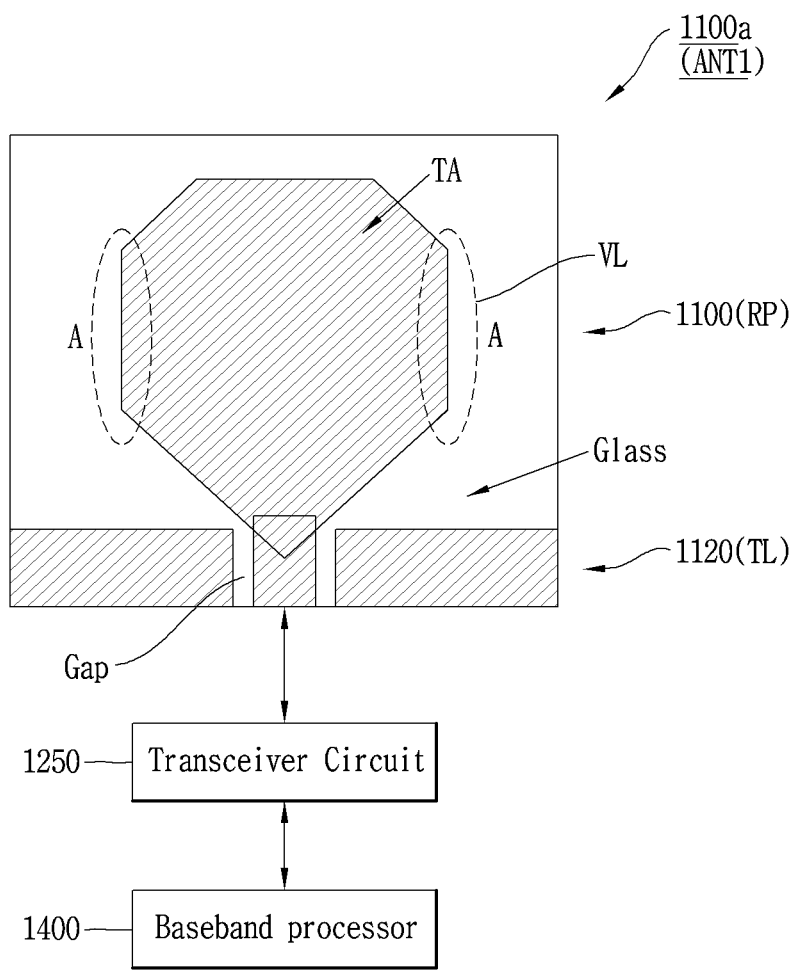
FIGS. 7A to 7C show an antenna and a configuration for controlling the antenna according to various embodiments.
Figure 7B:
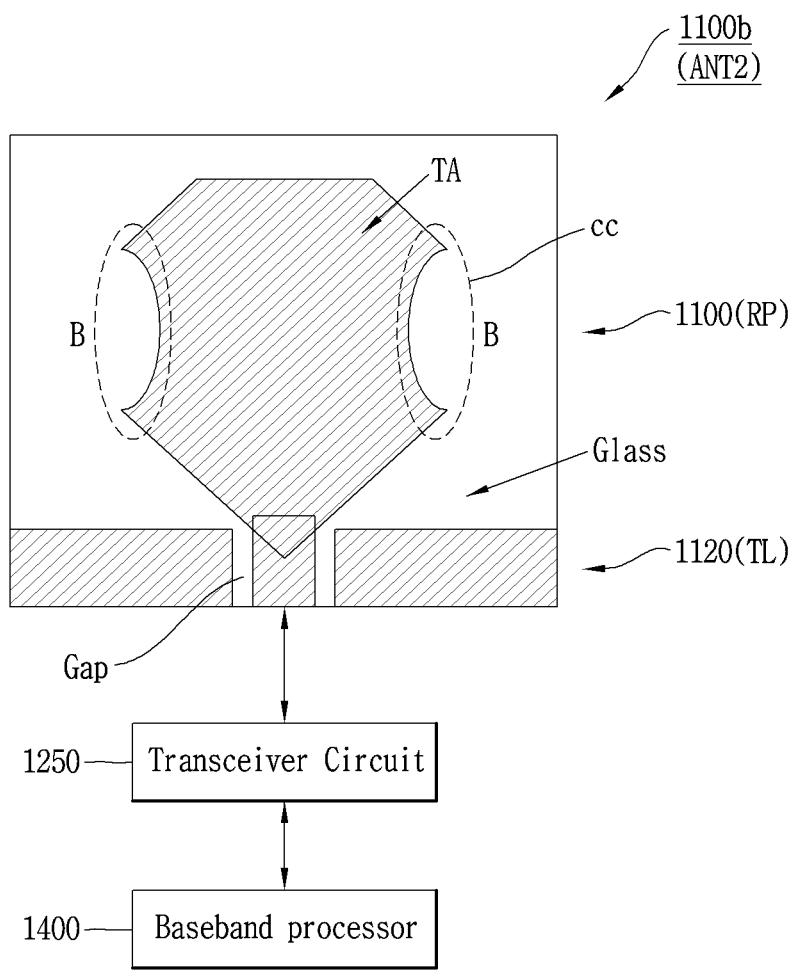
Figure 7C:
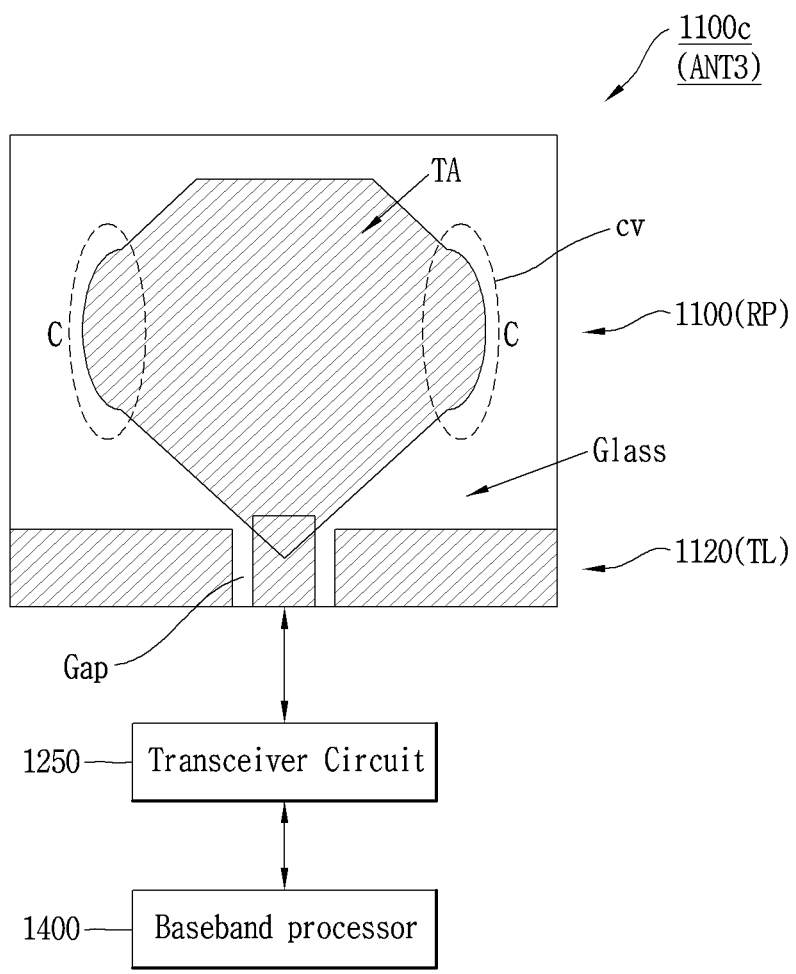

In this regard, FIGS. 7A to 7C show an antenna and a configuration for controlling the antenna according to various embodiments. FIG. 7A shows the first antenna 1100*a* (ANT1) in which portions of the left region and the right region are defined as vertical lines VL and a configuration for controlling the first antenna 1100*a* (ANT1). Meanwhile, FIG. 7B shows the second antenna 1100*b* (ANT2) in which partial lines of the left region and the right region are defined as curves CV in a concave form and a configuration for controlling the second antenna 1100*b* (ANT2). Furthermore, FIG. 7C shows the third antenna 1100*c* (ANT3) in which partial lines of the left region and the right region are defined as curves CC in a convex form and a configuration for controlling the third antenna 1100c (ANT3). In this regard, in FIGS. 7A to 7C, antennas according to various embodiments, that is, antennas having a vertical line structure, a concave structure, and a convex structure may be referred to as Type 1, Type 2, and Type 3 antennas, respectively.

Referring to FIG. 7A, in a rectangular patch (RP) 1110a of the first antenna 1100a (ANT1), partial lines A of the left region and the right region may be defined as vertical lines VL. Referring to FIG. 7B, in a rectangular patch (RP) 1110b of the second antenna 1100b (ANT2), partial lines B of the left region and the right region may be defined as curves CV in a concave form. Meanwhile, referring to FIG. 7C, in a rectangular patch (RP) 1110c of the third antenna 1100c (ANT3), partial lines C of the left region and the right region may be defined as curves CC in a convex form.

Meanwhile, referring to FIGS. 6A to 7B, the electronic device may further include a transceiver circuit 1250 corresponding to an RFIC. Furthermore, the electronic device may further include a baseband processor 1400 corresponding to a modem. The transceiver circuit 1250 may be operatively coupled to the first antenna (ANT1) to the third antenna (ANT3). The transceiver circuit 1250 may be configured to transmit and receive signals through at least one of the first antenna (ANT1) to the third antenna (ANT3).

The baseband processor 1400 may be operatively coupled to the transceiver circuit 1250. The baseband processor 1400 may be configured to control the transceiver circuit 1250. The baseband processor 1400 may control the transceiver circuit 1250 to transmit or receive a first signal through the first antenna (ANT1) having vertical lines VL in a first band within a 5G Sub6 band.

Meanwhile, in the antenna according to various embodiments described herein, a current distribution is slightly different depending on a shape in which the left region and the right region are disposed. Accordingly, the antenna according to various embodiments have different radiation efficiency band characteristics depending on a shape in which the left region and the right region are disposed.

Figure 8:
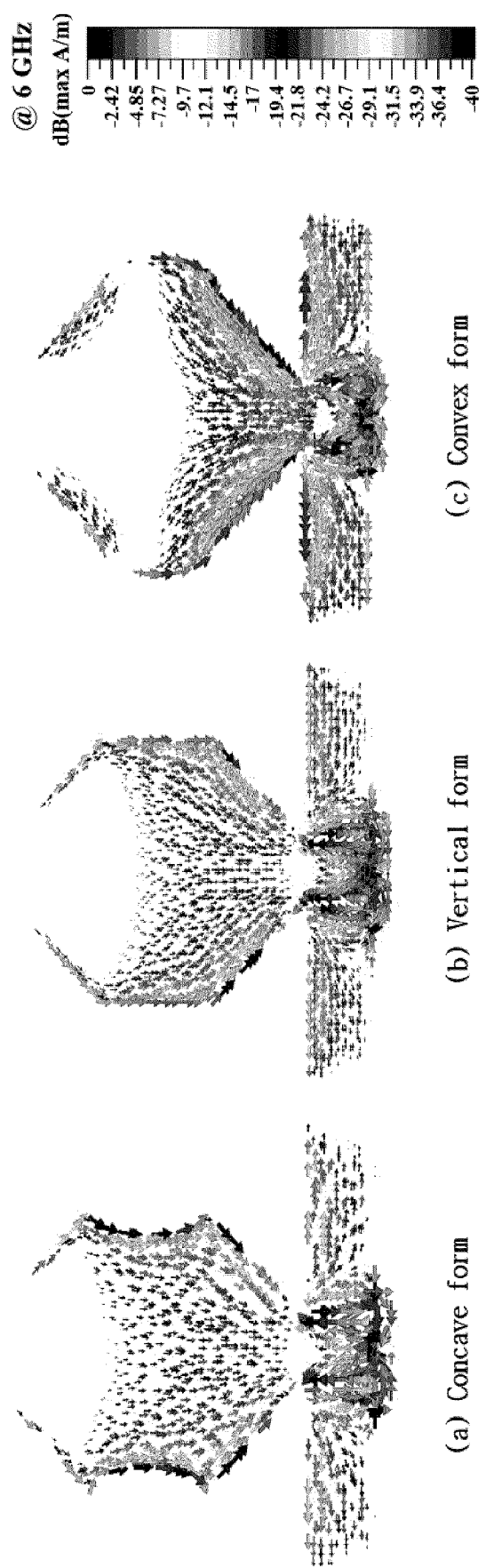
FIG. 8 shows a current distribution of an antenna according to various embodiments. In addition.
Figure 9:
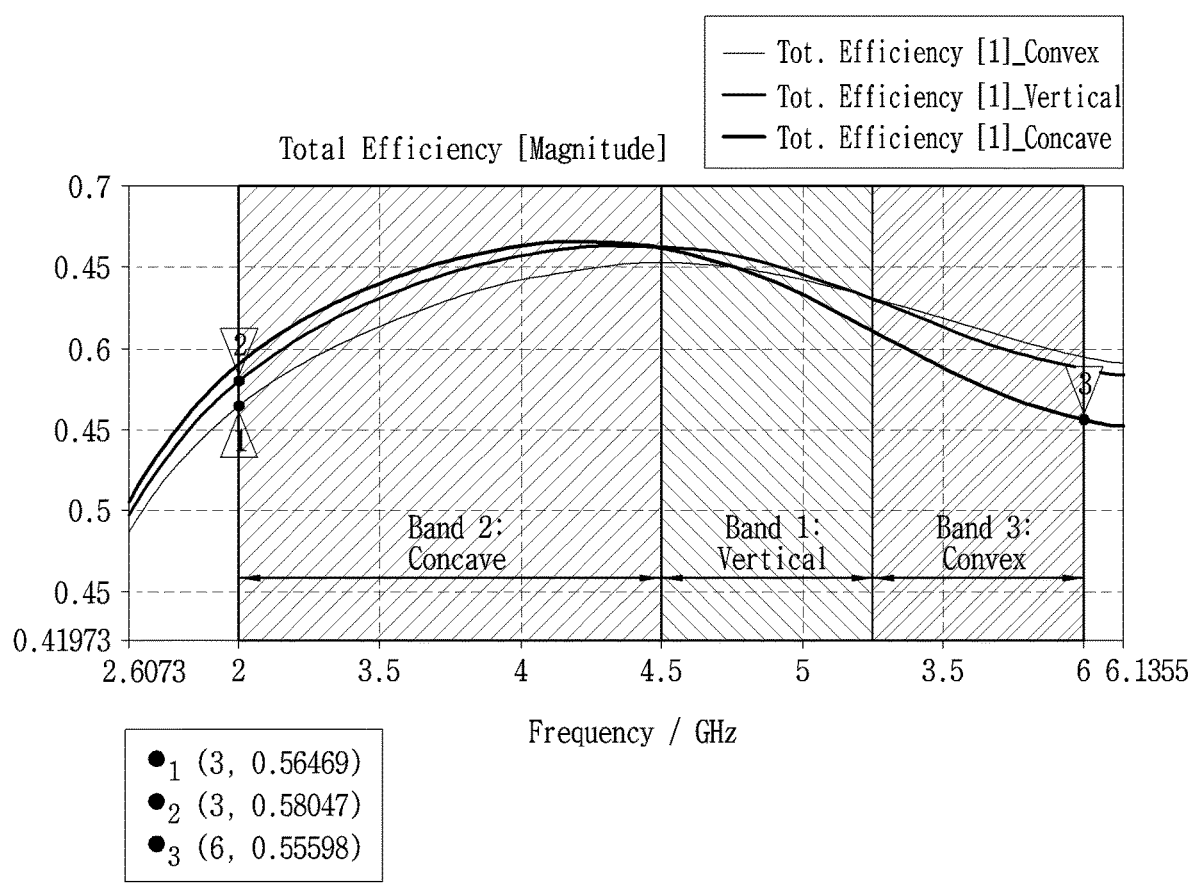
FIG. 9 shows a radiation efficiency band characteristic of an antenna according to various embodiments.

In this regard, FIG. 8 shows a current distribution of an antenna according to various embodiments. In addition, FIG. 9 shows a radiation efficiency band characteristic of an antenna according to various embodiments.

Referring to FIGS. 7B and 8(a), the current distribution is concentrated in an edge region B of the second antenna 1100b (ANT2) defined as a curve in a concave form. Furthermore, partial lines B in the left region and the right region are defined as curves CC in a concave form to increase the resonance length in the edge region B. Accordingly, referring to FIGS. 7B, 8(a) and 9, the second antenna 1100b (ANT2) shows the highest radiation efficiency in a second band (Band 2), which is a low band.

Accordingly, referring to FIGS. 6A to 9, the baseband processor 1400 may control the second antenna 1100b (ANT2) in which partial lines thereof are defined in a concave form to operate in a second band (Band 2) lower than the first band (Band 1). Furthermore, the baseband processor 1400 may control the transceiver circuit 1250 to transmit or receive a second signal through the second antenna 1100b (ANT2) in the second band (Band 2).

Referring to FIGS. 7B and 8(b), in the first antenna 1100a (ANT1) in which partial lines thereof are disposed as vertical lines VL, the current distribution is concentrated in the edge region A. In addition, partial lines A of the left region and the right region are defined as vertical lines VL, and the resonance length in the edge region A is somewhat reduced compared to that of the concave form. Accordingly, referring to FIGS. 7B, 8(b) and 9, the first antenna 1100a (ANT1) shows the highest radiation efficiency in a first band (Band 1), which is a middle band.

Accordingly, referring to FIGS. 6A to 9, the baseband processor 1400 may control the first antenna 1100a (ANT1) in which partial lines are formed as vertical lines VL to operate in the first band (Band 1) Furthermore, the baseband processor 1400 may control the transceiver circuit 1250 to transmit or receive a first signal through the first antenna 1100a (ANT1) in the first band (Band1).

Referring to FIGS. 7B and 8(c), the current distribution is concentrated in an edge region C of the third antenna 1100c (ANT3) defined as a curve in a convex form. Furthermore, partial lines C in the left region and the right region are defined as curves CV in a convex form, and the resonance length in the edge region C is somewhat reduced compared to that of the vertical line VL. Accordingly, referring to FIGS. 7B, 8(c) and 9, the third antenna 1100c (ANT3) shows the highest radiation efficiency in a third band (Band 3), which is a high band.

Accordingly, referring to FIGS. 6A to 9, the baseband processor 1400 may control the third antenna 1100c (ANT3) in which partial lines thereof are defined in a convex form to operate in a third band (Band 3) higher than the first band (Band 1). Furthermore, the baseband processor 1400 may control the transceiver circuit 1250 to transmit or receive a third signal through the third antenna 1100c (ANT3) in the third band (Band 3).

Meanwhile, referring to FIG. 6B, two or more Type 1 antennas having any one of different types of antennas, for example, vertical lines VL, may be disposed. However, the present disclosure is not limited thereto, and two or more Type 2 antennas having concave lines CC may be disposed. In addition, two or more Type 3 antennas having a convex line CV may be disposed.

For an example, referring to FIG. 6B, the transparent antenna (TA) may be configured with a plurality of antennas 1100a to 1100d (ANT1 to ANT4) in different regions of the display. In this regard, positions at which the plurality of antennas 1100a to 1100d (ANT1 to ANT4) are disposed are not limited to FIG. 6B and may be changed according to an application. For an example, the plurality of antennas 1100a to 1100d (ANT1 to ANT4) may be disposed in upper and lower regions of the display. For another example, the plurality of antennas 1100a to 1100d (ANT1 to ANT4) may be disposed in any one of upper and left regions, upper and right regions, lower and left regions, and lower and right regions of the display. For another example, the plurality of antennas 1100a to 1100d (ANT1 to ANT4) may be disposed to be spaced apart from one another by a predetermined distance in any one of upper, lower, left, and right regions of the display.

Referring to FIGS. 6B to 9, in the first antenna 1100a (ANT1) and the fourth antenna 1100d (ANT4) of the plurality of antennas, portions of a left region and a right region thereof may be defined as vertical lines VL. In the second antenna 1100b (ANT2) of the plurality of antennas, partial lines of a left region and a right region thereof may be defined as curves in a concave form. Meanwhile, in the third antenna 1100c (ANT3) of the plurality of antennas, partial lines of a left region and a right region thereof may be defined as curves in a convex form.

The transceiver circuit 1250 may be operatively coupled to the first antenna (ANT1) to the fourth antenna 1100d (ANT4). The transceiver circuit 1250 may be configured to transmit and receive signals through at least one of the first antenna (ANT1) to the fourth antenna 1100d (ANT4).

The baseband processor 1400 may be operatively coupled to the transceiver circuit 1250. The baseband processor 1400 may be configured to control the transceiver circuit 1250. The baseband processor 1400 may control the transceiver circuit 1250 to transmit or receive a first signal through the first antenna (ANT1) having vertical lines VL in a first band within a 5G Sub6 band. Furthermore, the baseband processor 1400 may control the transceiver circuit 1250 to transmit or receive a second signal through the second antenna ANT2 to perform multi-input multi-output (MIMO).

In this regard, the efficiency of the first antenna (ANT1) having vertical lines VL or the second antenna (ANT2) having concave lines CC is higher than that of the third antenna (ANT3) in the first band (Band 1). Accordingly, an efficiency during multi-input multi-output (MIMO) can be improved through the first antenna (ANT1) and the second antenna (ANT2) having high radiation efficiencies in the first band (Band 1). Furthermore, a level difference between signals transmitted or received through the first antenna (ANT1) and the second antenna (ANT2) may be minimized.

The baseband processor 1400 may perform multi-input multi-output (MIMO) through one of the first antenna (ANT1) and the fourth antenna (ANT4) and the second antenna (ANT2) in a second band lower than the first band.

In this regard, the efficiency of the first and fourth antennas (ANT1, ANT4) having vertical lines VL or the second antenna (ANT2) having concave lines CC is higher than that of the third antenna (ANT3) in the second band (Band 2). Accordingly, an efficiency during multi-input multi-output (MIMO) can be improved through the first antenna (ANT1) or the fourth antenna (ANT4) and the second antenna (ANT2) having high radiation efficiencies in the second band (Band 2). Furthermore, a level difference between signals transmitted or received through the first antenna (ANT1) or the fourth antenna (ANT4) and the second antenna (ANT2) may be minimized.

Meanwhile, when an interference level between different streams during multi-input multi-output (MIMO) is determined to be above a threshold value, it may be returned to a single transmission or reception mode. Accordingly, the baseband processor 1400 may control the transceiver circuit 1250 to transmit or receive a second signal through the second antenna (ANT2) in the second band (Band 2).

The baseband processor 1400 may perform multi-input multi-output (MIMO) through one of the first antenna (ANT1) and the fourth antenna (ANT4) and the third antenna (ANT3) in a third band (Band 3) higher than the first band.

In this regard, the efficiency of the first and fourth antennas (ANT1, ANT4) having vertical lines VL or the third antenna (ANT3) having convex lines CV is higher than that of the second antenna (ANT2) in the third band (Band 3). Accordingly, an efficiency during multi-input multi-output (MIMO) can be improved through the first antenna (ANT1) or the fourth antenna (ANT4) and the third antenna (ANT3) having high radiation efficiencies in the third band (Band 3). Furthermore, a level difference between signals transmitted or received through the first antenna (ANT1) or the fourth antenna (ANT4) and the third antenna (ANT3) may be minimized.

Meanwhile, when an interference level between different streams during multi-input multi-output (MIMO) is determined to be above a threshold value, it may be returned to a single transmission or reception mode. Accordingly, the baseband processor 1400 may control the transceiver circuit 1250 to transmit or receive a third signal through the third antenna (ANT3) in the third band (Band 3).

According to an embodiment, carrier aggregation (CA) may be performed through a plurality of antennas of different types to perform broadband communication. In this regard, the baseband processor 1400 may transmit or receive a signal through the first antenna (ANT1) in a first band and through the second antenna (ANT2) in the form of a concave line in a second band lower than the first band to perform carrier aggregation (CA). Alternatively, the baseband processor 1400 may transmit or receive a signal through the fourth antenna (ANT4) in a first band and through the second antenna (ANT2) in the form of a concave line in a second band lower than the first band to perform carrier aggregation (CA). Accordingly, an efficiency during carrier aggregation (CA) can be enhanced through an antenna having an optimal radiation efficiency in different bands. In addition, a level difference between signals transmitted or received through different antennas may be minimized.

In this regard, the baseband processor 1400 may transmit or receive a signal through the first antenna (ANT1) in a first band and through the third antenna (ANT3) in the form of a convex line in a third band higher than the first band to perform carrier aggregation (CA). Alternatively, the baseband processor 1400 may transmit or receive a signal through the fourth antenna (ANT4) in a first band and through the third antenna (ANT3) in the form of a convex line in a third band higher than the first band to perform carrier aggregation (CA). Accordingly, an efficiency during carrier aggregation (CA) can be enhanced through an antenna having an optimal radiation efficiency in different bands. In addition, a level difference between signals transmitted or received through different antennas may be minimized.

In the above, an electronic device having a plurality of antennas having different shapes according to an aspect of the present disclosure has been described. Hereinafter, a vehicle having a plurality of antennas having different shapes according to another aspect of the present disclosure will be described.

Figure 10:
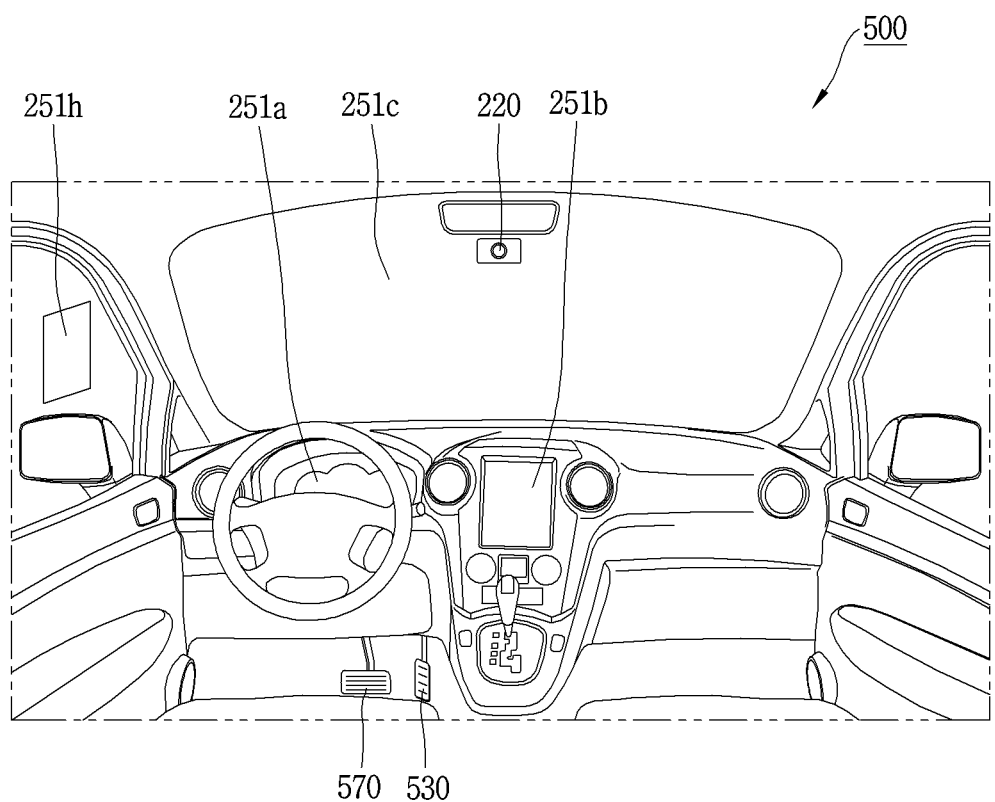
FIG. 10 is a view illustrating an interior of a vehicle according to an embodiment.

In this regard, FIG. 10 is a view illustrating an interior of a vehicle according to an embodiment. Referring to FIG. 10, a vehicle 500 may include a display 251c disposed in front and a display 251h on a side surface thereof.

In this regard, the display 251 may display graphic objects corresponding to various types of information.

The display 251 may include at least one of a liquid crystal display (LCD), a thin-film transistor liquid crystal display (TFT LCD), an organic light-emitting diode (OLED), a flexible display, a 3D display, and an e-ink display.

The display 251 may have an inter-layered structure or an integrated structure with a touch input unit in order to implement a touch screen.

The display 251 may be implemented as a head-up display (HUD). When the display 251 is implemented as a HUD, the display 251 may include a projection module to output information through an image projected on a windshield or a window.

The display 251 may include a transparent display. The transparent display may be attached to the windshield or the window.

The transparent display may display a predetermined screen with a predetermined transparency. In order to achieve transparency, the transparent display may include at least one of a transparent Thin Film Electroluminescent (TFEL) display, an Organic Light Emitting Diode (OLED)

display, a transparent Liquid Crystal Display (LCD), a transmissive transparent display, and a transparent Light Emitting Diode (LED) display. The transparency of the transparent display may be adjustable.

Meanwhile, the user interface device may include a plurality of displays 251a to 251g.

The display 251 may be disposed in a region of a steering wheel, a region 251a, 251b, 251e of an instrument panel, a region 251d of a seat, a region 251f of each pillar, a region 251g of a door, a region of a center console, a region of a head lining, a region of a sun visor, a region 251c of a windshield, or a region 251h of a window.

Figure 11:
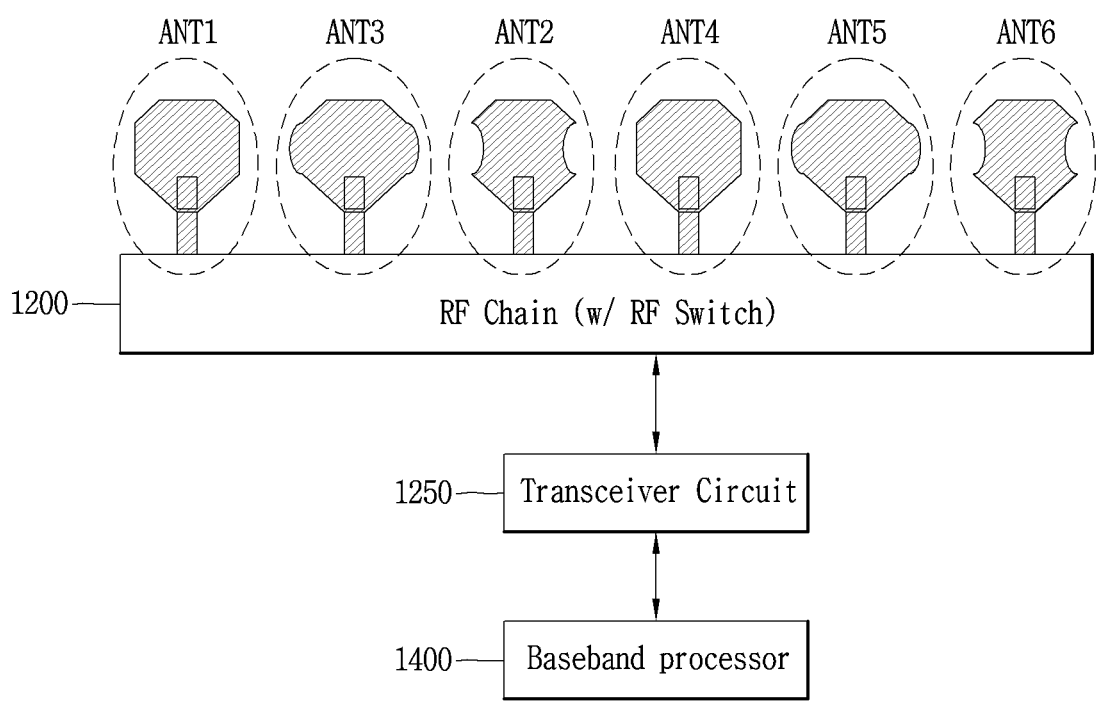
FIG. 11 shows a plurality of transparent antennas and a configuration for controlling the antenna according to an embodiment.

In this regard, at least one antenna may be selected and operated for each relevant band among the plurality of antenna elements on the above-described display 251. In this regard, FIG. 11 shows a plurality of transparent antennas and a configuration for controlling the transparent antennas according to an embodiment. In this regard, referring to FIGS. 4 to 11, a plurality of antennas provided in an electronic device or a vehicle may be implemented as transparent antennas. Here, the transparent antenna (TA) may be made of a transparent conducting oxide (TCO), a silver nanowire, carbon nanotube (CNT), graphene, a conductive polymer, an indium tin oxide (ITO) thin film.

In this regard, the transparent antenna (TA) by a TCO process may be made by performing a process of depositing a transparent electrode on glass as a single layer to form an antenna shape. Accordingly, the transparent antenna (TA) by the TCO process operates as an antenna that forms an electric field due to a potential difference between a ground portion and a radiator included in a feeding structure. to radiate the electric field.

Referring to FIGS. 4 to 11, the vehicle 500 having the display 251 according to an embodiment may include a transparent antenna (TA), a transmission line (TL) 1120, and a transceiver circuit 1250. In this regard, the vehicle 500 having the display 251 may further include an RF chain 1200 corresponding to a front end. In this case, an RF chain 1200 may include an RF switch to select an optimal antenna for each relevant band. The RF switch may be configured to select two or more antennas to perform MIMO in a relevant band. Furthermore, the vehicle 500 having the display 251 may further include a baseband processor 1400 corresponding to a modem.

In this regard, the transceiver circuit 1250 may be operatively coupled to the transparent antenna (TA) through the transmission line (TL) 1120, and may be configured to transmit and receive a signal to and from the transparent antenna (TA). The baseband processor 1400 may be configured to be operatively coupled to the transceiver circuit 1250 to control the transceiver circuit 1250.

Meanwhile, the antenna 1100 is configured with a transparent antenna (TA) made of a conductive material formed on or inside the substrate made of a glass material. For an example, the transparent antenna (TA) may be disposed on the vehicle display 251 or may be embedded therein and configured to radiate a signal to a front of the display. Here, the transparent antenna (TA) may be defined in a state in which a rectangular patch is rotated at a predetermined angle. For an example, the transparent antenna (TA) may be embedded into a display or disposed on the display to radiate a signal to the front of the display. In this regard, the transparent antenna (TA) may be configured in the form of a rectangular patch (RP) 1110 rotated at a predetermined angle. Meanwhile, portions of the left and right regions of the rectangular patch (RP) 1110 may be defined as vertical lines VL.

In this regard, a corner of the rectangular patch (RP) 1110 may be defined in a cut structure such that part of the left and right regions of the rotated rectangular patch (RP) 1110 is defined as a vertical line VL. A rectangular patch antenna in which portions of the left and right regions of the rotated rectangular patch (RP) 1110 are defined as vertical lines VL may be referred to as a Type 1 antenna.

Furthermore, a portion of an upper region of the rotated rectangular patch (RP) 1110 may be defined as a horizontal line HL. In this regard, a corner of the rectangular patch (RP) 1110 may be defined in a cut structure such that a portion of an upper region of the rotated rectangular patch (RP) 1110 is defined as a horizontal line HL. On the contrary, a corner is not defined in a cut structure in a lower region of the rotated rectangular patch (RP) 1110. In this regard, a lower region of the rotated rectangular patch (RP) 1110 may be connected to a feeding line (FL) in the form of a transmission line (TL) 1120. A rectangular patch antenna in which portions of the left and right regions of the rotated rectangular patch (RP) 1110 are defined as vertical lines VL and a portion of the upper region is defined as a horizontal line HL may be referred to as a Type 1 antenna.

In this regard, the transmission line (TL) 1120 is configured to feed the transparent antenna. In this regard, the transmission line (TL) 1120 may include a co-planar waveguide-type feeding line (FL) and ground regions GND disposed in left and right regions of the feeding line (FL). A gap may be defined between the feeding line (FL) and the ground region GND to define a co-planar waveguide structure.

According to an embodiment, the transparent antenna (TA) may include the rectangular patch (RP) 1110, the feeding line (FL), and the ground region GND. Here, the feeding line (FL) and the ground region GND may be referred to as a transmission line (TL) 1120. In this regard, the rectangular patch (RP) 1110 may be disposed on the display, and disposed in the form of being rotated at a predetermined angle. The feeding line (FL) may be configured to transmit a signal to the rectangular patch (RP) 1110. The feeding line (FL) may be defined to be connected to connection points at different corners of the rotated rectangular patch (RP) 1110. The ground region GND may be configured to be disposed in a left region and a right region of the feeding line (FL). In this regard, the vertical line VL defined in the rectangular patch (RP) 1110 may be defined in a direction perpendicular to the current direction of the ground region GND.

Figure 12:
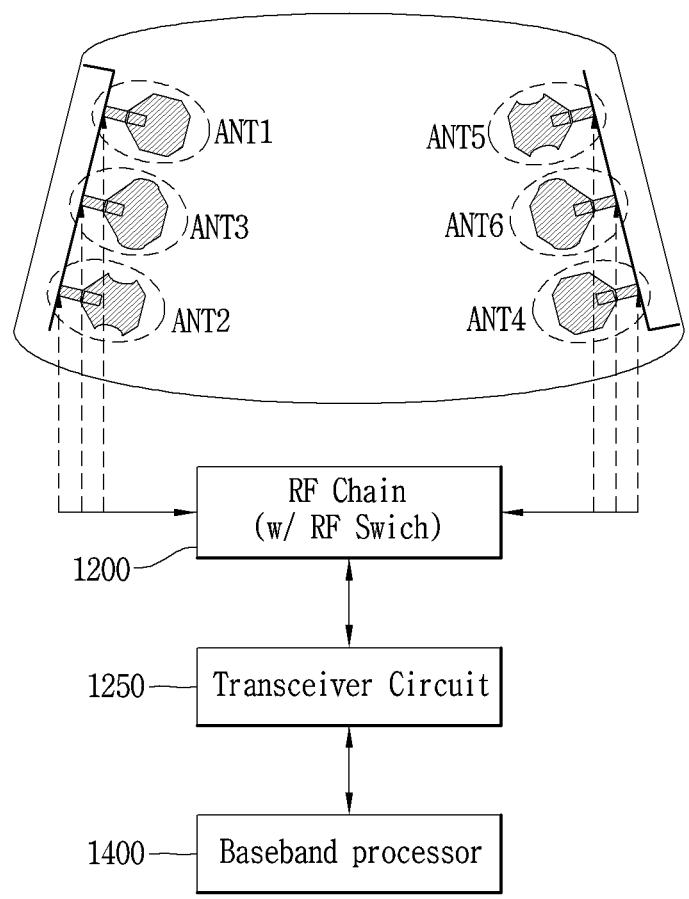
FIG. 12 shows a configuration for controlling a plurality of antennas in an embodiment in which a plurality of antennas of different types as shown in FIG. 11 are implemented in a vehicle display.

Meanwhile, FIG. 12 shows a configuration for controlling a plurality of antennas in an embodiment in which the plurality of antennas of different types as shown in FIG. 11 are implemented in a vehicle display. Referring to FIGS. 4 to 12, the transparent antenna (TA) may be configured with a plurality of antennas (ANT1 to ANT6) in different regions of the display. In this regard, positions at which the plurality of antennas (ANT1 to ANT6) in a disposed are not limited to FIG. 12 and may be changed according to an application. For an example, the plurality of antennas (ANT1 to ANT6) may be disposed in upper and lower regions of the display. For another example, the plurality of antennas (ANT1 to ANT6) may be disposed in any one of upper and left regions, upper and right regions, lower and left regions, and lower and right regions of the display. For another example, the plurality of antennas (ANT1 to ANT6) may be disposed to be spaced apart from one another by a predetermined distance in any one of upper, lower, left, and right regions of the display.

In the first antenna and the fourth antenna (ANT4) of the plurality of antennas, portions of a left region and a right region thereof may be defined as vertical lines VL. In the second antenna (ANT2) and the fifth antenna (ANT5) of the plurality of antennas, partial lines of a left region and a right region thereof may be defined as curves in a concave form. Meanwhile, in the third antenna (ANT3) and the sixth antenna (ANT6) of the plurality of antennas, partial lines of a left region and a right region thereof may be defined as curves in a convex form.

In this regard, the first antenna (ANT1) to the third antenna (ANT3) disposed at one side of the display 251 may be referred to as a first antenna module. On the contrary, the fourth antenna (ANT4) to the sixth antenna (ANT6) disposed on the other side of the display 251 may be referred to as a second antenna module. In this regard, the first antenna (ANT1) to the third antenna (ANT3) may be sequentially adjacent to one another to be disposed at one side of the display 251. Furthermore, the fourth antenna (ANT4) to the sixth antenna (ANT6) may be sequentially adjacent to one another to be disposed at the other side of the display 251.

In order to improve a degree of isolation between antennas having the same shape, the first antenna (ANT1) may be disposed above and the fourth antenna (ANT4) may be disposed below. In addition, the second antenna (ANT2) may be disposed below and the fifth antenna (ANT5) may be disposed above.

The baseband processor 1400 may perform MIMO through different antennas having corresponding shapes. In this regard, the baseband processor 1400 may select the first antenna (ANT1) and the fourth antenna (ANT4) having vertical lines in a first band within the 5G Sub6 band. Accordingly, the baseband processor 1400 may control the transceiver circuit 1250 to perform MIMO by transmitting or receiving a first signal and a second signal through the first antenna (ANT1) and the fourth antenna (ANT4), respectively.

The baseband processor 1400 may select the second antenna (ANT2) and the fifth antenna (ANT5) in which partial lines thereof are defined in a concave form in a second band lower than the first band. Accordingly, the baseband processor 1400 may control the transceiver circuit 1250 to perform MIMO by transmitting or receiving a third signal and a fourth signal through the second antenna (ANT2) and the fifth antenna (ANT5), respectively.

The baseband processor 1400 may select the third antenna (ANT3) and the sixth antenna (ANT6) in which partial lines thereof are defined in a convex form in a third band higher than the first band. Accordingly, the baseband processor 1400 may control the transceiver circuit 1250 to perform MIMO by transmitting or receiving a fifth signal and a seventh signal through the third antenna (ANT3) and the sixth antenna (ANT6), respectively.

The baseband processor 1400 may perform carrier aggregation (CA) through antennas having different shapes in different bands. In this regard, the baseband processor 1400 may perform carrier aggregation (CA) by transmitting or receiving a signal through one of the first antenna and the fourth antenna in a first band and through one of the second antenna and fifth antenna in the form of a concave line in a second band lower than the first band.

Meanwhile, the baseband processor 1400 may perform carrier aggregation (CA) by transmitting or receiving a signal through one of the first antenna and the fourth antenna in a first band and through one of the third antenna and sixth antenna in the form of a convex line in a third band higher than the first band.

Various changes and modifications to the above-described embodiments related to a transparent antenna having various shapes, an antenna system including a plurality of antennas, a vehicle in which the antenna system is mounted, and a control operation therefor may be clearly understood by those skilled in the art within the concept and scope of the present disclosure. Accordingly, various changes and modifications to the embodiments are to be understood as falling within the scope of the following claims.

In the above, a transparent antenna having various shapes according to the present disclosure has been described. An electronic device having such a transparent antenna or a wireless communication system including a vehicle and a base station will be described as follows. In this regard, FIG. 13 illustrates a block diagram of a wireless communication system that is applicable to methods proposed herein.

Figure 13:
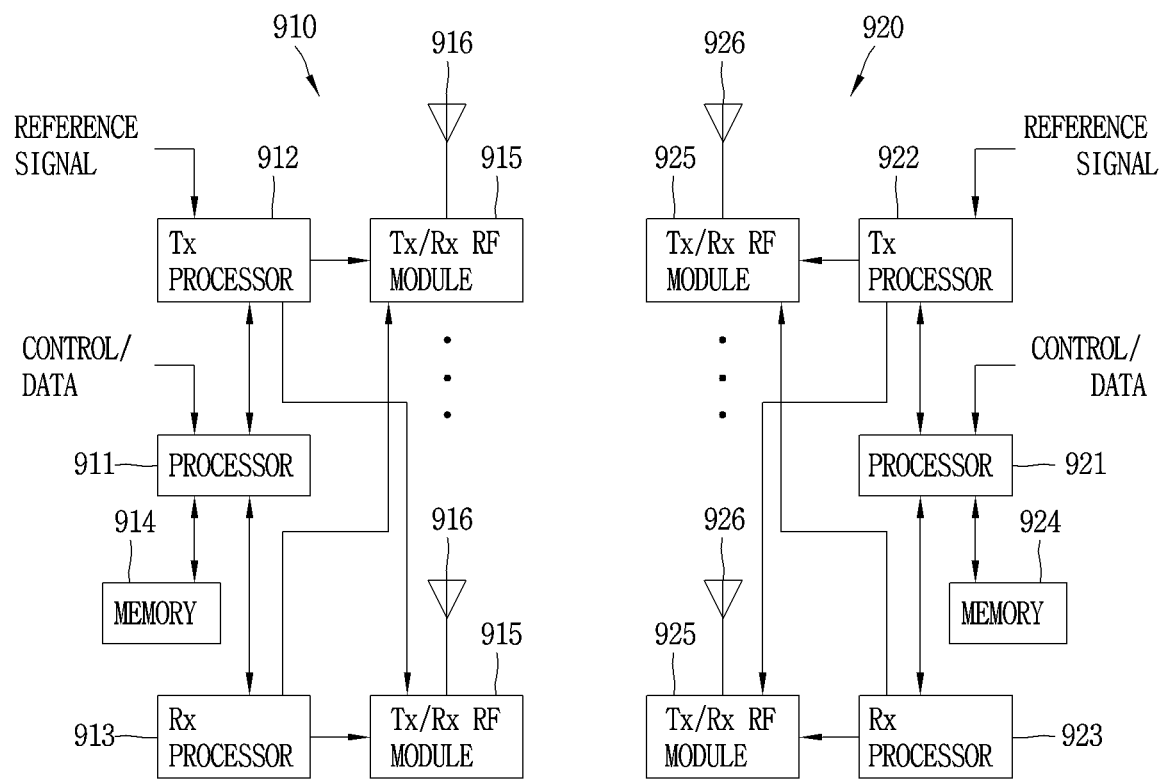
FIG. 13 illustrates a block diagram of a wireless communication system that is applicable to methods proposed herein.

Referring to FIG. 13, the wireless communication system includes a first communication device 910 and/or a second communication device 920. "A and/or B" may be interpreted to denote the same as "comprising at least one of A and B". The first communication device may represent a base station, and the second communication device may represent a terminal (or the first communication device may represent a terminal or a vehicle, and the second communication device may represent a base station).

The base station (BS) may be replaced with a term such as a fixed station, a Node B, an evolved-NodeB (eNB), a Next Generation NodeB (gNB), a base transceiver system (BTS), an access point (AP), or a general NB (gNB), a 5G system, a network, an AI system, a road side unit (RSU), robot or the like. In addition, a terminal may be fixed or mobile, and may include a user equipment (UE), a mobile station (MS), a user terminal (UT), a mobile subscriber station (MSS), a subscriber station (SS), and an advanced mobile (AMS), a wireless terminal (WT), a machine-type communication (MTC) device, an machine-to-machine (M2M) device, a device-to-device (D2D) device, a vehicle, a robot, an AI module or the like.

The first communication device and the second communication device include processors 911, 921, memories 914, 924, one or more Tx/Rx radio frequency modules 915, 925, Tx processors 912, 922, Rx processors 913, 923, and antennas 916, 926. The processor implements functions, processes, and/or methods described above. More specifically, in the DL (communication from a first communication device to a second communication device), an upper layer packet from the core network is provided to the processor 911. The processor implements functions of an L2 layer. In the DL, the processor provides multiplexing, radio resource allocation between a logical channel and a transport channel to the second communication device 920, and is responsible for signaling to the second communication device. A transmit (TX) processor 912 implements various signal processing functions for a L1 layer (i.e., physical layer). The signal processing functions facilitate forward error correction (FEC) in the second communication device, and include coding and interleaving. The encoded and modulated symbols are divided into parallel streams, and each stream is mapped to an OFDM subcarrier, and multiplexed with a reference signal (RS) in a time and/or frequency domain, and combined together using an Inverse Fast Fourier Transform (IFFT) to create a physical channel carrying a time-domain OFDMA symbol stream. An OFDM stream is spatially precoded to produce multiple spatial streams. Each spatial stream may be provided to different antennas 916 through individual Tx/Rx modules (or transceivers 915). Each Tx/Rx module may modulate an RF carrier with each spatial stream for transmission. In the second communication device, each Tx/Rx module (or transceiver) 925 receives a signal through each antenna 926 of each Tx/Rx module. The each Tx/Rx module recovers information modulated onto an RF carrier, and provides it to the receive (RX) processor 923. The RX processor implements various signal processing functions of layer 1. The RX processor may perform spatial processing on the information to recover any spatial streams destined for the second communication device. If multiple spatial streams are directed to the second communication device, they may be combined into a single OFDMA symbol stream by multiple RX processors. The RX processor converts the OFDMA symbol stream from a time domain to a frequency domain using fast Fourier transform (FFT). The frequency domain signal includes an individual OFDMA symbol stream for each subcarrier of the OFDM signal. The symbols and reference signal on each subcarrier are recovered and demodulated by determining the most likely signal placement points transmitted by the first communication device. Such soft decisions may be based on channel estimate values. The soft decisions are decoded and deinterleaved to recover data and control signals originally transmitted by the first communication device on the physical channel. The corresponding data and control signals are provided to the processor 921.

The UL (communication from the second communication device to the first communication device) is processed at the first communication device 910 in a similar manner to that described in connection with a receiver function at the second communication device 920. Each Tx/Rx module 925 receives a signal via each antenna 926. Each Tx/Rx module provides an RF carrier and information to the RX processor 923. The processor 921 may be associated with the memory 924 that stores program codes and data. The memory may be referred to as a computer readable medium.

In the above, a transparent antenna provided in an electronic device or a vehicle has been described. The technical effects of such a transparent antenna provided in an electronic device or a vehicle will be described as follows.

According to an embodiment, a vertical line may be formed in a region where an electric field is formed in a state in which a transparent antenna element provided in an electronic device or a vehicle is rotated at a predetermined angle to improve radiation efficiency.

According to an embodiment, a structure capable of concentrating a surface current on an edge surface of an antenna element may be proposed, thereby enhancing electric field radiation to maximize radiation efficiency.

According to an embodiment, a resonance phenomenon between a ground region and a radiator may be generated in a wide band to improve a radiation efficiency bandwidth.

According to an embodiment, since maximum and minimum values are higher than those of the efficiency of a transparent antenna in the related art and a radiation efficiency band thereof is wide, it is suitable for use in 5G vehicle and mobile communication.

According to an embodiment, a transparent antenna structure having a wide radiation efficiency band for vehicle and mobile communication using a 5G Sub6 band may be provided for each band.

According to an embodiment, an antenna structure may be provided in the form of a vertical line, a concave line, or a convex line for each different band, thereby providing an optimal radiation efficiency for each different band.

According to an embodiment, in a configuration of a plurality of antennas for providing an optimal radiation efficiency for each different band, a radiation efficiency and a characteristic difference between antennas having different shapes may be taken into consideration, thereby providing multi-input multi-output (MIMO) optimized for each band.

According to an embodiment, in a configuration of a plurality of antennas for providing optimal radiation efficiency for each different band, a radiation efficiency and a characteristic difference between antennas having different shapes may be taken into consideration, thereby providing carrier aggregation optimized for a combination of a plurality of bands.

Further scope of applicability of the present disclosure will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art.

In relation to the aforementioned present disclosure, the design of a plurality of antennas of various types, the design of a configuration for controlling the same, and an operation thereof can be implemented as computer-readable codes in a program-recorded medium. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include a controller of the terminal. Therefore, it should also be understood that the above-described embodiments are not limited by any of the details of the foregoing description, unless otherwise specified, but rather should be construed broadly within its scope as defined in the appended claims. The scope of the invention should be determined by reasonable interpretation of the appended claims and all changes that come within the equivalent scope of the invention are included in the scope of the invention.

What is claimed is:

1. An electronic device having an antenna, the electronic device comprising:
 a plurality of transparent antennas embedded into different regions of a display and configured to radiate corresponding signals to a front of the display;
 a transmission line that feeds each of the plurality of transparent antennas,
 wherein each of the plurality of transparent antennas includes a feeding line and a ground region disposed in a left region and a right region of the feeding line, and
 wherein each of the plurality of transparent antennas is configured in the form of a rectangular patch antenna that is rotated at a predetermined angle, and
 wherein, in a first rectangular patch antenna of the plurality of transparent antennas, portions of a left region and a right region of the first rectangular patch antenna are cut so as to form straight vertical lines, and a top region of the first rectangular patch antenna is cut, so as to convert the first rectangular patch antenna into a first heptagon patch antenna,
 wherein the straight vertical lines are in a direction perpendicular to a current direction of the corresponding ground region, wherein, in a second rectangular patch antenna of the plurality of transparent antennas, portions of a left region and a right region of the second rectangular patch antenna are cut so as to form opposing curved lines, and a top region of the second rectangular patch antenna is cut, so as to convert the second rectangular patch antenna into a second heptagon patch antenna having two opposing curved sides, wherein the opposing curved lines of the second heptagon patch antenna are in a direction perpendicular to a current direction of the corresponding ground region.

2. The electronic device of claim 1,
wherein, in a third rectangular patch antenna of the plurality of transparent antennas, portions of a left region and a right region of the third rectangular patch antenna are cut so as to form opposing curved lines, and a top region of the second rectangular patch antenna is cut, so as to convert the third rectangular patch antenna into a third heptagon patch antenna having two opposing curved sides, wherein the opposing curved lines of the third heptagon patch antenna are in a direction perpendicular to a current direction of the corresponding ground region, wherein one of the opposing curved lines of the second heptagon patch antenna or the opposing curved lines of the third heptagon patch antenna are convex curves, and another of the opposing curved lines of the second heptagon patch antenna or the opposing curved lines of the third heptagon patch antenna are concave curves.

3. The electronic device of claim 2, further comprising:
a transceiver circuit operatively coupled to the first heptagon patch antenna to the third heptagon patch antenna, and configured to transmit and receive a signal through at least one of the first heptagon patch antenna to the third heptagon patch antenna.

4. The electronic device of claim 3, further comprising:
a baseband processor operatively coupled to the transceiver circuit, and configured to control the transceiver circuit,
wherein the baseband processor controls the transceiver circuit to transmit or receive a first signal through the first heptagon patch antenna in a first band within a 5G Sub6 band.

5. The electronic device of claim 4,
wherein the opposing curved lines of the second heptagon patch antenna are concave curves, and
wherein the baseband processor controls the transceiver circuit to transmit or receive a second signal through the second heptagon patch antenna in a second band lower than the first band.

6. The electronic device of claim 4,
wherein the opposing curved lines of the third heptagon patch antenna are convex curves, and
wherein the baseband processor controls the transceiver circuit to transmit or receive a third signal through the third heptagon patch antenna in a third band higher than the first band.

7. An electronic device having an antenna, the electronic device comprising:
four transparent antennas embedded into different regions of a display and configured to radiate corresponding signals to a front of the display;
a transmission line that feeds each of the four of transparent antennas,
wherein each of the four transparent antennas includes a feeding line and a ground region disposed in a left region and a right region of the feeding line, and wherein each of the four transparent antennas is configured in the form of a rectangular patch antenna that is rotated at a predetermined angle, and wherein, in a first and fourth rectangular patch antennas of the four transparent antennas, portions of a left region and a right region are cut so as to form straight vertical lines, and a top region is cut, so as to convert the first and fourth rectangular patch antennas into a first and fourth heptagon patch antennas, wherein the straight vertical lines of the first and fourth heptagon patch antennas are in a direction perpendicular to a current direction of the corresponding ground region, wherein, in a second rectangular patch antenna of the four transparent antennas, portions of a left region and a right region of the second rectangular patch antenna are cut so as to form opposing curved lines, and a top region of the second rectangular patch antenna is cut, so as to convert the second rectangular patch antenna into a second heptagon patch antenna having two opposing concave sides, wherein, in a third rectangular patch antenna of the four transparent antennas, portions of a left region and a right region of the third rectangular patch antenna are cut so as to form opposing curved lines, and a top region of the third rectangular patch antenna is cut, so as to convert the third rectangular patch antenna into a third heptagon patch antenna having two opposing convex sides, wherein the opposing curved lines of the second and third heptagon patch antennas are in a direction perpendicular to a current direction of the corresponding ground region, the electronic device further comprising:
a transceiver circuit operatively coupled to the first heptagon patch antenna to the fourth heptagon patch antenna, and configured to transmit and receive a signal through at least one of the first heptagon patch antenna to the fourth heptagon patch antenna.

8. The electronic device of claim 7, further comprising:
a baseband processor operatively coupled to the transceiver circuit, and configured to control the transceiver circuit,
wherein the baseband processor controls the transceiver circuit to perform multi-input multi-output (MIMO) by transmitting or receiving a first signal through the first heptagon patch antenna in a first band that is a 5G Sub6 band, and by transmitting or receiving a second signal through the second heptagon patch antenna.

9. The electronic device of claim 7, wherein the baseband processor:
performs multi-input multi-output (MIMO) through one of the first heptagon patch antenna and the fourth heptagon patch antenna and the second heptagon patch antenna in a second band lower than the first band, and
controls the transceiver circuit to transmit or receive a second signal through the second heptagon patch antenna in the second band.

10. The electronic device of claim 7, wherein the baseband processor:
performs multi-input multi-output (MIMO) through one of the first heptagon patch antenna and the fourth heptagon patch antenna and the third heptagon patch antenna in a third band higher than the first band, and
controls the transceiver circuit to transmit or receive a third signal through the third heptagon patch antenna in the third band.

11. The electronic device of claim 7, wherein the baseband processor:
   performs carrier aggregation (CA) by transmitting or receiving a signal through one of the first heptagon patch antenna or the fourth heptagon patch antenna in the first band, and through the second heptagon patch antenna in the form of a concave line in a second band lower than the first band, and
   performs carrier aggregation (CA) by transmitting or receiving a signal through one of the first heptagon patch antenna and the fourth heptagon patch antenna in the first band, and through the third heptagon patch antenna in the form of a convex line in a third band higher than the first band.

12. A vehicle having a display, the vehicle comprising:
   six transparent antennas embedded into different regions of a display and configured to radiate corresponding signals to a front of the display;
   a transmission line that feeds each of the four of transparent antennas,
   wherein each of the six transparent antennas includes a feeding line and a ground region disposed in a left region and a right region of the feeding line, and
   wherein each of the six transparent antennas is configured in the form of a rectangular patch antenna that is rotated at a predetermined angle, and
   wherein, in a first and fourth rectangular patch antenna of the four transparent antennas, portions of a left region and a right region are cut so as to form straight vertical lines, and a top region is cut, so as to convert the first and fourth rectangular patch antennas into a first and fourth heptagon patch antennas,
   wherein the straight vertical lines of the first and fourth heptagon patch antennas are in a direction perpendicular to a current direction of the corresponding ground region,
   wherein, in a second and a fifth rectangular patch antenna of the six transparent antennas, portions of a left region and a right region of the second rectangular patch antenna are cut so as to form opposing curved lines, and a top region of the second rectangular patch antenna is cut, so as to convert the second and fifth rectangular patch antennas into a second and fifth heptagon patch antenna having two opposing concave sides,
   wherein, in a third and sixth rectangular patch antenna of the six transparent antennas, portions of a left region and a right region of the third and sixth rectangular patch antenna are cut so as to form opposing curved lines, and a top region of the third and sixth rectangular patch antenna is cut, so as to convert the third and sixth rectangular patch antenna into a third and sixth heptagon patch antenna having two opposing convex sides,
   wherein the opposing curved lines of the second, third, fifth and sixth heptagon patch antennas are in a direction perpendicular to a current direction of the corresponding ground region,
   wherein the first heptagon patch antenna to the third heptagon patch antenna are sequentially adjacent to one another to be disposed at one side of the display, and the fourth heptagon patch antenna to the sixth heptagon patch antenna are sequentially adjacent to one another to be disposed at the other side of the display
   the electronic device further comprising:
   a transceiver circuit operatively coupled to the first heptagon patch antenna to the sixth heptagon patch antenna, and configured to transmit and receive a signal through at least one of the first heptagon patch antenna to the sixth heptagon patch antenna; and
   a baseband processor operatively coupled to the transceiver circuit, and configured to control the transceiver circuit.

13. The vehicle of claim 12, wherein the baseband processor:
   controls the transceiver circuit to perform MIMO by transmitting or receiving a first signal and a second signal respectively through the first heptagon patch antenna and the fourth heptagon patch antenna in a first band within a 5G Sub6 band,
   controls the transceiver circuit to transmit or receive a third signal and a fourth signal respectively through the second heptagon patch antenna and the fifth heptagon patch antenna in a second band lower than the first band, and
   controls the transceiver circuit to transmit or receive a fifth signal and a sixth signal respectively through the third heptagon patch antenna and the sixth heptagon patch antenna in a third band higher than the first band.

* * * * *